(12) United States Patent
Kidiyoor et al.

(10) Patent No.: US 12,744,624 B2
(45) Date of Patent: Sep. 22, 2026

(54) REDUCTION OF ISO BANDWIDTH ON A CENTRAL WIRELESS DEVICE

(71) Applicant: QUALCOMM Incorporated, San Diego, CA (US)

(72) Inventors: Nitin Raghavendra Kidiyoor, Bangalore (IN); Steven Singer, Cambridge (GB); Giriraj Goyal, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 18/752,266

(22) Filed: Jun. 24, 2024

(65) Prior Publication Data

US 2025/0392410 A1 Dec. 25, 2025

(51) Int. Cl.
*H04L 1/1607* (2023.01)
*H04B 1/713* (2011.01)

(52) U.S. Cl.
CPC .......... *H04L 1/1621* (2013.01); *H04B 1/713* (2013.01)

(58) Field of Classification Search
None
See application file for complete search history.

(56) References Cited

U.S. PATENT DOCUMENTS

2012/0195250 A1 8/2012 Jain et al.
2020/0084759 A1* 3/2020 Liu ...................... H04L 1/1671
2022/0399959 A1 12/2022 Berliner et al.
2024/0089715 A1* 3/2024 Haggai .............. H04W 56/001
2024/0155683 A1* 5/2024 Gao ..................... H04L 5/0012

FOREIGN PATENT DOCUMENTS

WO WO-2023146565 A1 8/2023

OTHER PUBLICATIONS

International Search Report and Written Opinion PCT/US2025/033073 ISA/EPO Oct. 16, 2025 (2402184WO).

* cited by examiner

*Primary Examiner* — Saad Khawar
(74) *Attorney, Agent, or Firm* — Holland & Hart LLP

(57) ABSTRACT

This disclosure provides methods, components, devices and systems related to a central wireless device combining feedback for each peripheral wireless device of a connected isochronous group (CIG) into a single feedback message, thereby increasing the bandwidth available for Wi-Fi communications on the same band. In some examples, the central wireless device may monitor a first subevent of an isochronous interval for a first data packet from a first peripheral wireless device in the CIG and a second subevent of the isochronous interval for a second data packet from a second peripheral wireless device in the CIG. The central wireless device may transmit, in a third subevent of the isochronous interval and to each peripheral wireless device in the CIG, a group feedback message. The remaining subevents of the isochronous interval not used for isochronous streams may be used for Wi-Fi communications.

16 Claims, 11 Drawing Sheets

600

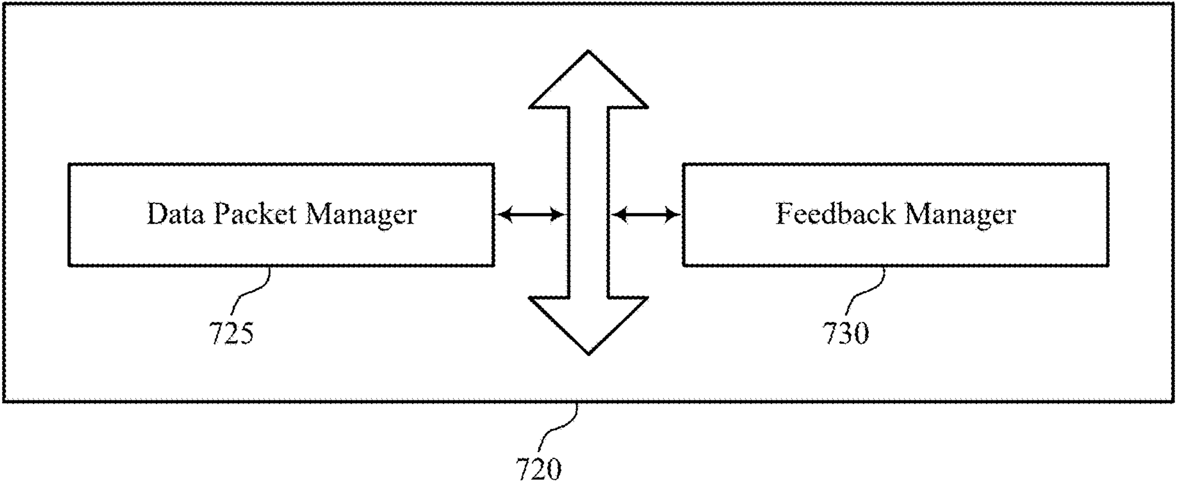
*Figure 7*

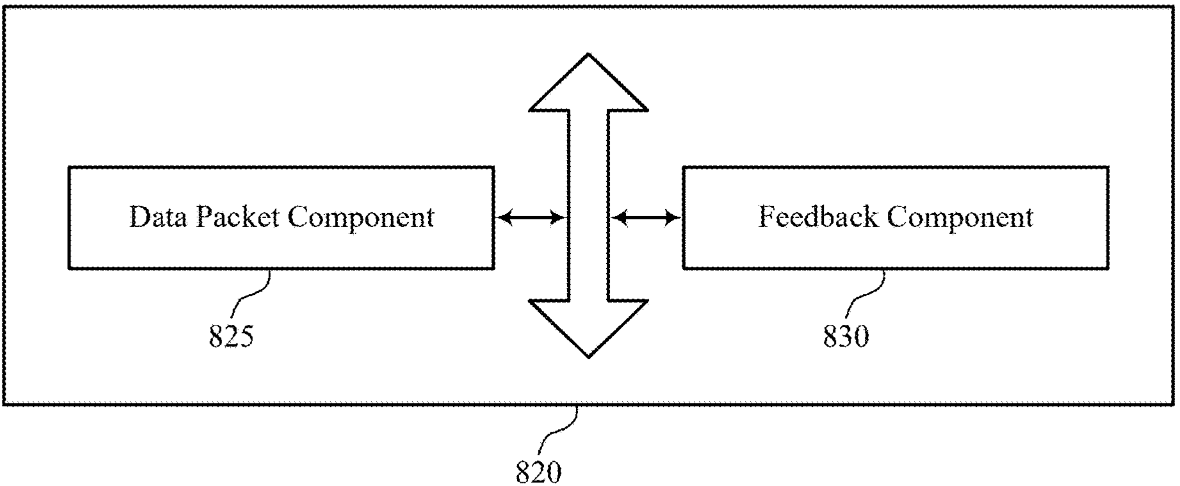
*Figure 8*

Figure 9:
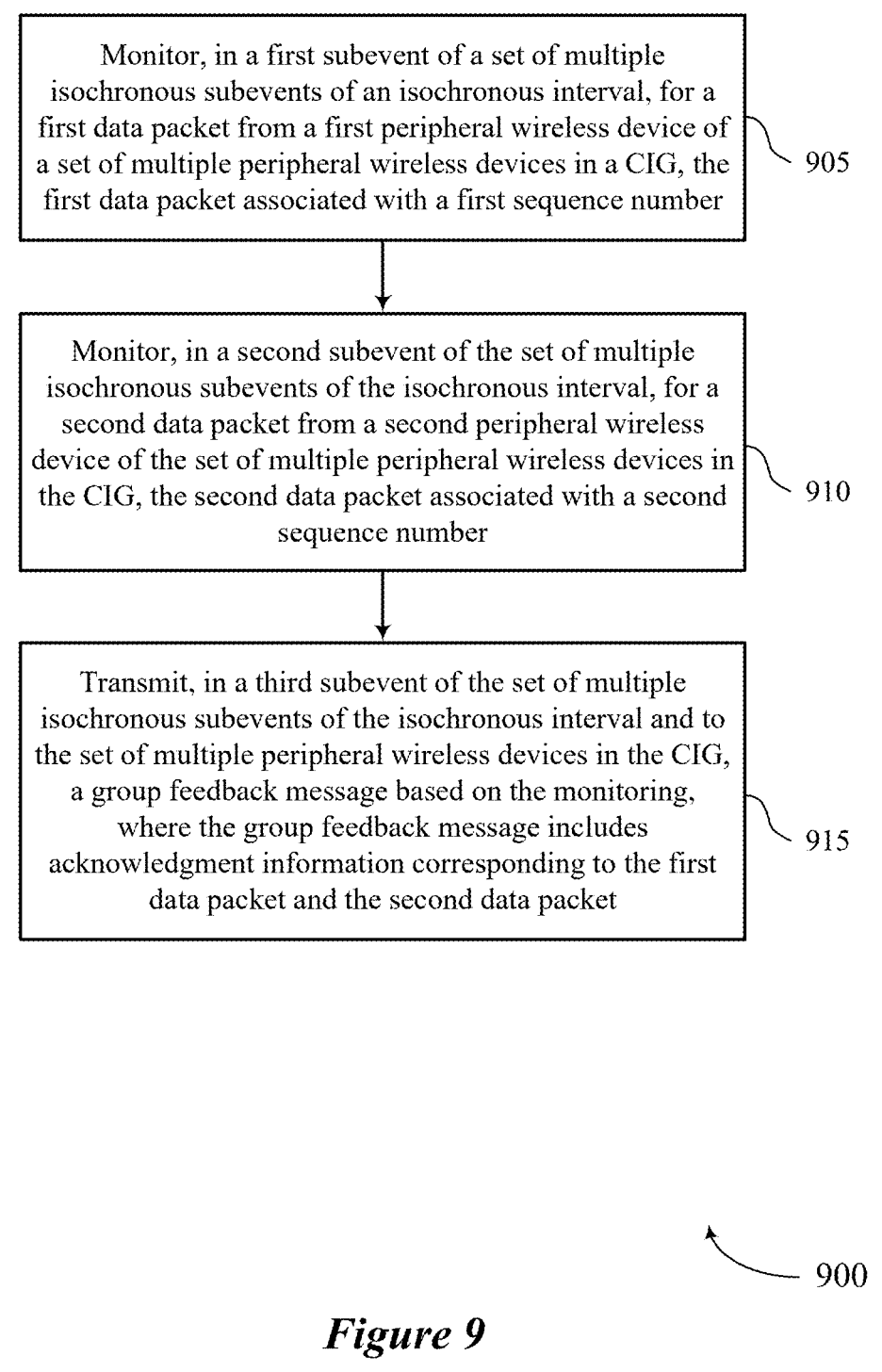

Monitor, in a first subevent of a set of multiple isochronous subevents of an isochronous interval, for a first data packet from a first peripheral wireless device of a set of multiple peripheral wireless devices in a CIG, the first data packet associated with a first sequence number

905

Monitor, in a second subevent of the set of multiple isochronous subevents of the isochronous interval, for a second data packet from a second peripheral wireless device of the set of multiple peripheral wireless devices in the CIG, the second data packet associated with a second sequence number

910

Transmit, in a third subevent of the set of multiple isochronous subevents of the isochronous interval and to the set of multiple peripheral wireless devices in the CIG, a group feedback message based on the monitoring, where the group feedback message includes acknowledgment information corresponding to the first data packet and the second data packet

Transmit, in a first subevent of a set of multiple isochronous subevents of an isochronous interval, a first data packet associated with a first sequence number

1105

Receive, in a second subevent of the set of multiple isochronous subevents of the isochronous interval, a group feedback message based on transmitting the first data packet, where the group feedback message includes acknowledgment information corresponding to the first data packet and a second data packet from a second peripheral wireless device of a set of multiple peripheral wireless devices in a CIG

1110

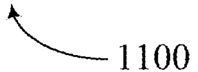

*Figure 11*

REDUCTION OF ISO BANDWIDTH ON A CENTRAL WIRELESS DEVICE

TECHNICAL FIELD

This disclosure relates generally to wireless communication and, more specifically, to reduction of isochronous (ISO) bandwidth on a central wireless device.

DESCRIPTION OF THE RELATED TECHNOLOGY

Wireless communication networks are widely deployed to provide various types of communication content such as voice, video, packet data, messaging, broadcast, and so on. Some wireless communication networks may be capable of supporting communication with multiple users by sharing the available system resources (such as time, frequency, or power). Further, a wireless communication network may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM), among other examples. Wireless communication devices may communicate in accordance with any one or more of such wireless communication technologies, and may include wireless stations (STAs), wireless access points (APs), user equipment (UEs), network entities, or other wireless nodes.

A device may be capable of both Bluetooth and WLAN communications. These communications may be associated with different communication protocols and, in some cases, may share a communication medium. As such, coexistence solutions to enable Bluetooth and WLAN communications by devices equipped with both Bluetooth and WLAN operation may be desired.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications by a central wireless device is described. The method may include monitoring, in a first subevent of a set of multiple isochronous subevents of an isochronous interval, for a first data packet from a first peripheral wireless device of a set of multiple peripheral wireless devices in a connected isochronous group, the first data packet associated with a first sequence number, monitoring, in a second subevent of the set of multiple isochronous subevents of the isochronous interval, for a second data packet from a second peripheral wireless device of the set of multiple peripheral wireless devices in the connected isochronous group, the second data packet associated with a second sequence number, and transmitting, in a third subevent of the set of multiple isochronous subevents of the isochronous interval and to the set of multiple peripheral wireless devices in the connected isochronous group, a group feedback message based on the monitoring, where the group feedback message includes acknowledgment information corresponding to the first data packet and the second data packet.

Another innovative aspect of the subject matter described in this disclosure can be implemented in a central wireless device for wireless communications. The central wireless device may include a processing system that includes processor circuitry and memory circuitry that stores code. The processing system may be configured to cause the central wireless device to monitor, in a first subevent of a set of multiple isochronous subevents of an isochronous interval, for a first data packet from a first peripheral wireless device of a set of multiple peripheral wireless devices in a connected isochronous group, the first data packet associated with a first sequence number, monitor, in a second subevent of the set of multiple isochronous subevents of the isochronous interval, for a second data packet from a second peripheral wireless device of the set of multiple peripheral wireless devices in the connected isochronous group, the second data packet associated with a second sequence number, and transmit, in a third subevent of the set of multiple isochronous subevents of the isochronous interval and to the set of multiple peripheral wireless devices in the connected isochronous group, a group feedback message based on the monitoring, where the group feedback message includes acknowledgment information corresponding to the first data packet and the second data packet.

Another innovative aspect of the subject matter described in this disclosure can be implemented in a central wireless device for wireless communications. The central wireless device may include means for monitoring, in a first subevent of a set of multiple isochronous subevents of an isochronous interval, for a first data packet from a first peripheral wireless device of a set of multiple peripheral wireless devices in a connected isochronous group, the first data packet associated with a first sequence number, means for monitoring, in a second subevent of the set of multiple isochronous subevents of the isochronous interval, for a second data packet from a second peripheral wireless device of the set of multiple peripheral wireless devices in the connected isochronous group, the second data packet associated with a second sequence number, and means for transmitting, in a third subevent of the set of multiple isochronous subevents of the isochronous interval and to the set of multiple peripheral wireless devices in the connected isochronous group, a group feedback message based on the monitoring, where the group feedback message includes acknowledgment information corresponding to the first data packet and the second data packet.

Another innovative aspect of the subject matter described in this disclosure can be implemented in a non-transitory computer-readable medium storing code for wireless communications. The code may include instructions executable by one or more processors to monitor, in a first subevent of a set of multiple isochronous subevents of an isochronous interval, for a first data packet from a first peripheral wireless device of a set of multiple peripheral wireless devices in a connected isochronous group, the first data packet associated with a first sequence number, monitor, in a second subevent of the set of multiple isochronous subevents of the isochronous interval, for a second data packet from a second peripheral wireless device of the set of multiple peripheral wireless devices in the connected isochronous group, the second data packet associated with a second sequence number, and transmit, in a third subevent of the set of multiple isochronous subevents of the isochronous interval and to the set of multiple peripheral wireless devices in the connected isochronous group, a group feedback message based on the monitoring, where the group feedback message includes acknowledgment information corresponding to the first data packet and the second data packet.

In some examples of the method, central wireless devices, and non-transitory computer-readable medium described herein, transmitting the group feedback message may include operations, features, means, or instructions for transmitting a single bit that indicates acknowledgment information for both the first peripheral wireless device and the second peripheral wireless device.

In some examples of the method, central wireless devices, and non-transitory computer-readable medium described herein, transmitting the group feedback message may include operations, features, means, or instructions for transmitting a bitmap that includes acknowledgment information for the first peripheral wireless device and acknowledgment information for the second peripheral wireless device, the bitmap indicating whether the central wireless device successfully received the first data packet, the second data packet, or both.

In some examples of the method, central wireless devices, and non-transitory computer-readable medium described herein, each of the first peripheral wireless device and the second peripheral wireless device may be associated with a respective frequency hopping pattern, and the group feedback message may be transmitted in accordance with the frequency hopping pattern of one or both of the first peripheral wireless device or the second peripheral wireless device.

Some examples of the method, central wireless devices, and non-transitory computer-readable medium described herein may further include operations, features, means, or instructions for transmitting an indication of which frequency hopping pattern to monitor for the group feedback message.

In some examples of the method, central wireless devices, and non-transitory computer-readable medium described herein, the first peripheral wireless device may be associated with a first set of one or more subevents of the isochronous interval and the second peripheral wireless device may be associated with a second set of one or more subevents of the isochronous interval, and the third subevent may be associated with one of the first set of one or more subevents or the second set of one or more subevents.

Another innovative aspect of the subject matter described in this disclosure can be implemented in a method for wireless communications by a first peripheral wireless device of a set of multiple peripheral wireless devices in a connected isochronous group. The method may include transmitting, in a first subevent of a set of multiple isochronous subevents of an isochronous interval, a first data packet associated with a first sequence number and receiving, in a second subevent of the set of multiple isochronous subevents of the isochronous interval, a group feedback message based on transmitting the first data packet, where the group feedback message includes acknowledgment information corresponding to the first data packet and a second data packet from a second peripheral wireless device of the set of multiple peripheral wireless devices in the connected isochronous group.

Another innovative aspect of the subject matter described in this disclosure can be implemented in a first peripheral wireless device of a set of multiple peripheral wireless devices in a connected isochronous group for wireless communications. The first peripheral wireless device of a set of multiple peripheral wireless devices in a connected isochronous group may include a processing system that includes processor circuitry and memory circuitry that stores code. The processing system may be configured to cause the first peripheral wireless device of a set of multiple peripheral wireless devices in a connected isochronous group to transmit, in a first subevent of a set of multiple isochronous subevents of an isochronous interval, a first data packet associated with a first sequence number and receive, in a second subevent of the set of multiple isochronous subevents of the isochronous interval, a group feedback message based on transmitting the first data packet, where the group feedback message includes acknowledgment information corresponding to the first data packet and a second data packet from a second peripheral wireless device of the set of multiple peripheral wireless devices in the connected isochronous group.

Another innovative aspect of the subject matter described in this disclosure can be implemented in a first peripheral wireless device of a set of multiple peripheral wireless devices in a connected isochronous group for wireless communications. The first peripheral wireless device of a set of multiple peripheral wireless devices in a connected isochronous group may include means for transmitting, in a first subevent of a set of multiple isochronous subevents of an isochronous interval, a first data packet associated with a first sequence number and means for receiving, in a second subevent of the set of multiple isochronous subevents of the isochronous interval, a group feedback message based on transmitting the first data packet, where the group feedback message includes acknowledgment information corresponding to the first data packet and a second data packet from a second peripheral wireless device of the set of multiple peripheral wireless devices in the connected isochronous group.

Another innovative aspect of the subject matter described in this disclosure can be implemented in a non-transitory computer-readable medium storing code for wireless communications. The code may include instructions executable by one or more processors to transmit, in a first subevent of a set of multiple isochronous subevents of an isochronous interval, a first data packet associated with a first sequence number and receive, in a second subevent of the set of multiple isochronous subevents of the isochronous interval, a group feedback message based on transmitting the first data packet, where the group feedback message includes acknowledgment information corresponding to the first data packet and a second data packet from a second peripheral wireless device of the set of multiple peripheral wireless devices in the connected isochronous group.

In some examples of the method, first peripheral wireless device of a set of multiple peripheral wireless devices in a connected isochronous groups, and non-transitory computer-readable medium described herein, receiving the group feedback message may include operations, features, means, or instructions for receiving a single bit that indicates acknowledgment information for both the first peripheral wireless device and the second peripheral wireless device.

In some examples of the method, first peripheral wireless device of a set of multiple peripheral wireless devices in a connected isochronous groups, and non-transitory computer-readable medium described herein, receiving the group feedback message may include operations, features, means, or instructions for receiving a bitmap that includes acknowledgment information for the first peripheral wireless device and acknowledgment information for the second peripheral wireless device, the bitmap indicating whether the first data packet, the second data packet, or both was successfully received.

In some examples of the method, first peripheral wireless device of a set of multiple peripheral wireless devices in a connected isochronous groups, and non-transitory computer-readable medium described herein, each of the first peripheral wireless device and the second peripheral wireless device may be associated with a respective frequency hopping pattern, and the group feedback message may be received in accordance with the frequency hopping pattern of one or both of the first peripheral wireless device or the second peripheral wireless device.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 7 shows a block diagram of an example wireless communication device that supports reduction of ISO bandwidth on a central wireless device.

FIG. 8 shows a block diagram of an example wireless communication device that supports reduction of ISO bandwidth on a central wireless device.

FIGS. 9 and 10 show flowcharts illustrating example processes performable by or at a central wireless device that supports reduction of ISO bandwidth on a central wireless device.

FIG. 11 shows a flowchart illustrating an example process performable by or at a first peripheral wireless device of a plurality of peripheral wireless devices in a connected isochronous group (CIG) that supports reduction of ISO bandwidth on a central wireless device.

Like reference numbers and designations in the various drawings indicate like elements.

DETAILED DESCRIPTION

Figure 1:
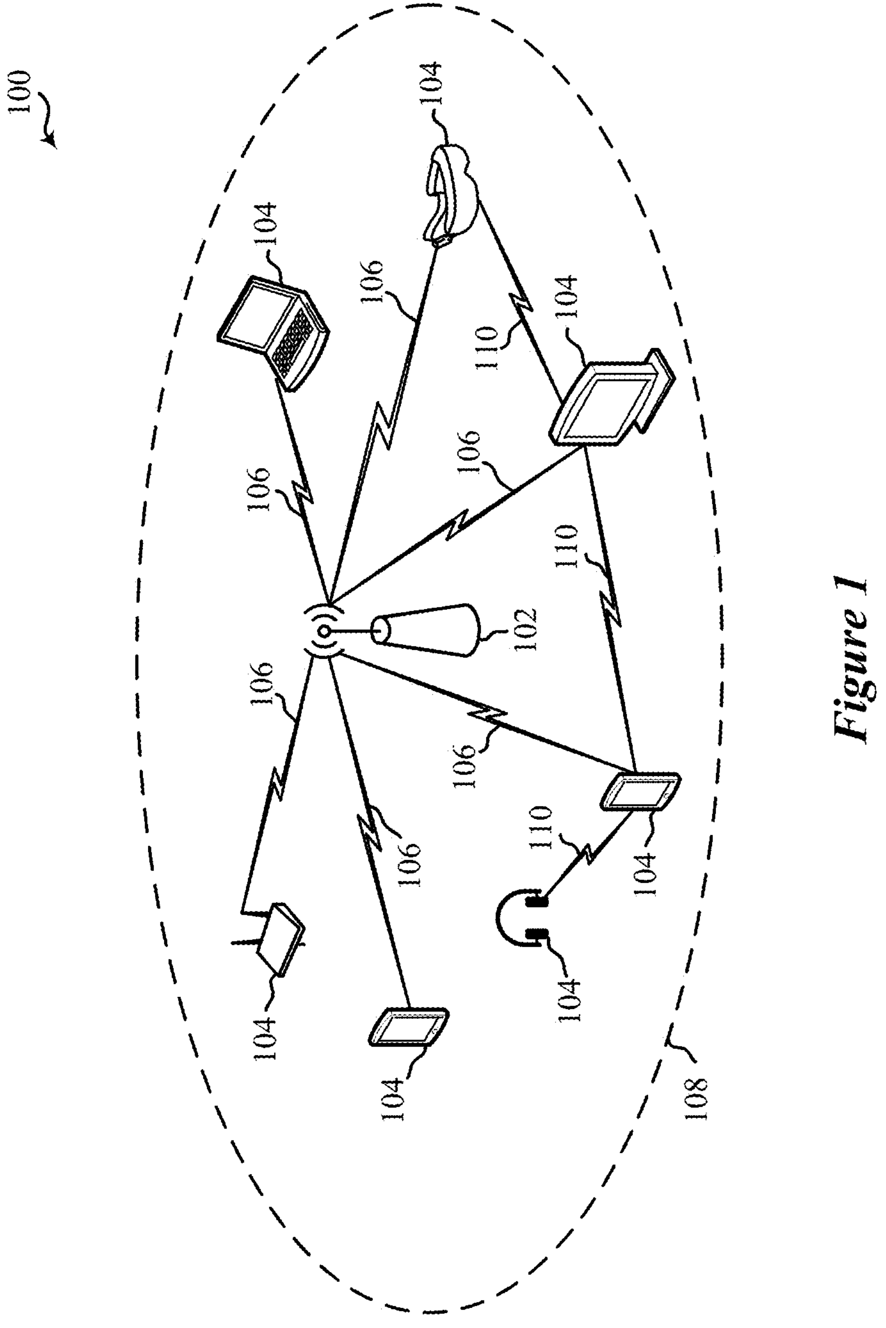
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, 5G (New Radio (NR)) or 6G standards promulgated by the 3rd Generation Partnership Project (3GPP), among others. The described examples can be implemented in any suitable device, component, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), a non-terrestrial network (NTN), or an internet of things (IOT) network.

Various aspects relate generally to communications between a central wireless device and two or more peripheral wireless devices in a connected isochronous group (CIG). Some aspects more specifically relate to combining feedback for each of the peripheral wireless devices into a single feedback message to increase the uninterrupted time resources available for Wi-Fi communications. In some examples, the central wireless device may monitor a first subevent of an isochronous interval for a first data packet from a first peripheral wireless device in a CIG and monitor a second subevent of the isochronous interval for a second data packet from a second peripheral wireless device in the CIG. The first data packet may be associated with a first sequence number (SN) and the second data packet may be associated with a second SN. The central wireless device may transmit, in a third subevent of the isochronous interval and to each peripheral wireless device in the CIG, a group feedback message based on the monitoring. The group feedback message may include a single bit acknowledging that the central wireless device successfully received a data packet from each peripheral wireless device in the CIG. In some implementations, the single bit may include a next expected sequence number (NESN) associated with future transmissions from one or both of the peripheral wireless devices in the CIG. Additionally, or alternatively, the group feedback message may include a bitmap that indicates an NESN for each peripheral wireless device in the CIG (such as acknowledging (ACK) or negative acknowledging (NACK) each data packet). The remaining subevents of the isochronous interval not used for isochronous streams may be used for Wi-Fi communications.

Particular aspects of the subject matter described in this disclosure can be implemented to realize one or more of the following potential advantages. In some examples, by combining feedback for each peripheral wireless device of a CIG into a group feedback message, the described techniques can be used to increase the uninterrupted time resources available for Wi-Fi communications (such as by saving bandwidth on both the central wireless device and the peripheral wireless devices). Increasing the bandwidth available for Wi-Fi may improve the reliability, quality, and efficiency of Wi-Fi data streams, resulting in higher throughput, better power efficiency, and greater overall spectral efficiency. The described techniques also may save power at the central wireless device by reducing the quantity of ACK transmissions by the central wireless device, for example from 2 ACK transmissions to 1 ACK transmission when the CIG includes 2 peripheral wireless devices.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bc, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core. In some other examples, the wireless communication network 100 can include a WLAN that functions in an interoperable or converged manner with one or more personal area networks, such as a network implementing Bluetooth or other wireless technologies, to provide greater or enhanced network coverage or to provide or enable other capabilities, functionality, applications or services.

The wireless communication network 100 may include numerous wireless communication devices including at least one wireless access point (AP) 102 and any quantity of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IOT) devices, and vehicles, among other examples.

The STAs 104 may be examples of central wireless devices (such as source devices) or may be examples of peripheral devices (such as sink devices) implementing WLAN communications (such as Wi-Fi communications) or Bluetooth communications. For example, central wireless devices may include cell phones, UEs, wireless STAs, mobile stations, personal digital assistant (PDAs), other handheld devices, netbooks, notebook computers, tablet computers, laptops, broadcaster audio devices, or some other suitable terminology. Peripheral devices may include Bluetooth-enabled devices capable of pairing with other Bluetooth-enabled devices (such as central wireless devices) or otherwise receiving unicast or broadcast Bluetooth communication and may include wireless audio devices (such as headsets, earbuds, speakers, earpieces, or headphones), display devices (such as TVs, glasses, or computer monitors), microphones, meters, or valves.

Bluetooth communications may refer to a short-range communication protocol and may be used to connect and exchange information between central wireless devices and peripheral devices (such as between mobile phones, computers, digital cameras, wireless headsets, speakers, keyboards, mice or other input peripherals, and similar devices). Bluetooth systems (such as aspects of wireless communication network 100) may be organized using a central-peripheral relationship employing a time-division duplex protocol having, for example, defined time slots of 625 microseconds, in which transmission alternates between the central wireless device (such as a source device) and one or more peripheral devices (such as sink devices). As such, in some examples, a device may be referred to as either a central wireless device or a peripheral device based on the Bluetooth role configuration of the device. That is, designation of a device as either a central wireless device or a peripheral device may not necessarily indicate a distinction in device capability, but rather may refer to or indicate roles held by the device in the wireless communication network 100. Generally, a central wireless device may refer to a wireless communication device capable of wirelessly exchanging data signals with another device (such as a peripheral device), and a peripheral device may refer to a device operating in a peripheral role, or to a short-range wireless communication device capable of exchanging data signals with the central wireless device (such as using Bluetooth communication protocols).

A Bluetooth-enabled device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats or particular options and parameters at each layer of the Bluetooth protocol stack. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth-enabled devices may be offering. The Bluetooth specification defines device role pairs (such as roles for a central wireless device and a peripheral device) that together form a single use case called a profile (such as for communications between the central wireless device and the peripheral device). One example profile defined in the Bluetooth specification is the Handsfree Profile (HFP) for voice telephony, in which one device (such as a central wireless device) implements an Audio Gateway (AG) role and the other device (such as a peripheral device) implements a Handsfree (HF) device role. Another example is the Advanced Audio Distribution Profile (A2DP) for high-quality audio streaming, in which one device (such as central wireless device) implements an audio source device (SRC) role and another device (such as peripheral device) implements an audio sink device (SNK) role.

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (such as flow control, acknowledgement mechanisms, repeat mechanisms, sequence numbering, or scheduling behavior. The Bluetooth protocol stack may be split in two parts: a controller stack including the timing critical radio interface, and a host stack handling high level data. The controller stack may be generally implemented in a low cost silicon device including one or more Bluetooth radios and one or more microprocessors. The controller stack may be responsible for setting up direct wireless communication links 110 such as asynchronous connection-less (ACL) links, (or ACL connections), synchronous connection orientated (SCO) links (or SCO connections), extended synchronous connection-oriented (eSCO) links (or eSCO connections), broadcast isochronous streams (BISs), connected isochronous streams (CISs), or other logical transport channel links.

A direct wireless communication link 110 may be established between two Bluetooth-enabled devices (such as between a central wireless device and a peripheral device) and may provide for communications or services (such as according to some Bluetooth profile). For example, a Bluetooth connection may be an eSCO connection for voice call (such as which may allow for retransmission) or an ACL connection for music streaming (such as A2DP), among other examples. For example, eSCO packets may be transmitted in predetermined time slots (such as 6 Bluetooth slots each for eSCO). The regular interval between the eSCO packets may be specified when the Bluetooth link is established. The eSCO packets to/from a specific peripheral device (such as a peripheral device) are acknowledged, and may be retransmitted if not acknowledged during a retransmission window. In addition, audio may be streamed between a central wireless device and a peripheral device using an ACL connection (A2DP profile). In some examples, the ACL connection may occupy 1, 3, or 5 Bluetooth slots for data or voice. Other Bluetooth profiles supported by Bluetooth-enabled devices may include Bluetooth Low Energy (BLE) (such as providing considerably reduced power consumption and cost while maintaining a similar communication range) or human interface device profile (HID) (such as providing low latency links with low power requirements).

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a central wireless device may support WLAN communications via an AP 102 (such as over communication links 106). The AP 102 and the associated central wireless devices may represent a basic service set (BSS) or an extended service set (ESS). The various central wireless devices in the network may be able to communicate with one another through the AP 102. In some examples, the AP 102 may be associated with a coverage area 108, which may represent a basic service area (BSA).

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

In some examples, content, media, or audio exchanged between a central wireless device and a peripheral device may originate from a WLAN. For example, in some examples, a central wireless device may receive audio from an AP 102 (such as via WLAN communications), and the central wireless device may relay or pass the audio to the peripheral device (such as via Bluetooth communications). In some examples, certain types of Bluetooth communications (such as such as high quality or high definition (HD) Bluetooth) may require enhanced quality of service (QOS). In some examples, delay-sensitive Bluetooth traffic may have higher priority than WLAN traffic.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple sub-bands and frequency channels (also referred to as subchannels). The terms "channel" and "subchannel" may be used interchangeably herein, as each may refer to a portion of frequency spectrum within a frequency band (such as a 20 MHz, 40 MHz, 80 MHz, or 160 MHz portion of frequency spectrum) via which communication between two or more wireless communication devices can occur. For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

Retransmission protocols, such as hybrid automatic repeat request (HARQ), also may offer performance gains. A HARQ protocol may support various HARQ signaling between transmitting and receiving wireless communication devices (such as the AP 102 and the STAs 104 described with reference to FIG. 1) as well as signaling between the PHY and MAC layers to improve the retransmission operations in a wireless communication network. HARQ uses a combination of error detection and error correction. For example, a HARQ transmission may include error checking bits that are added to data to be transmitted using an error-detecting (ED) code, such as a cyclic redundancy check (CRC). The error checking bits may be used by the receiving device to determine if it has properly decoded the received HARQ transmission. In some examples, the original data (information bits) to be transmitted may be encoded with a forward error correction (FEC) code, such as using a low-density parity check (LDPC) coding scheme that systematically encodes the information bits to produce parity bits. The transmitting device may transmit both the original information bits as well as the parity bits in the HARQ transmission to the receiving device. The receiving device may be able to use the parity bits to correct errors in the information bits, thus avoiding a retransmission.

Implementing a HARQ protocol in a wireless communication network may improve reliability of data communicated from a transmitting device to a receiving device. The HARQ protocol may support the establishment of a HARQ session between the two devices. Once a HARQ session is established, if a receiving device cannot properly decode (and cannot correct the errors) a first HARQ transmission received from the transmitting device, the receiving device may transmit a HARQ feedback message to the transmitting device (such as a negative acknowledgment (NACK)) that indicates at least part of the first HARQ transmission was not properly decoded. Such a HARQ feedback message may be different than the traditional Block ACK feedback message type associated with conventional ARQ. In response to receiving the HARQ feedback message, the transmitting device may transmit a second HARQ transmission to the receiving device to communicate at least part of further assist the receiving device in decoding the first HARQ transmission. For example, the transmitting device may include some or all of the original information bits, some or all of the original parity bits, as well as other, different parity bits in the second HARQ transmission. The combined HARQ transmissions may be processed for decoding and error correction such that the complete signal associated with the HARQ transmissions can be obtained.

In some examples, the receiving device may be enabled to control whether to continue the HARQ process or revert to a non-HARQ retransmission scheme (such as an automatic repeat request (ARQ) protocol). Such switching may reduce feedback overhead and increase the flexibility for retransmissions by allowing devices to dynamically switch between ARQ and HARQ protocols during frame exchanges. Some implementations also may allow multiplexing of communications that employ ARQ with those that employ HARQ.

In some examples, an AP 102 or a STA 104 may function as a central wireless device in communication with two or more peripheral wireless devices in a CIG (such as which each may be an example of an AP 102 or a STA 104). The central wireless device may be capable of both Bluetooth and WLAN communications. These communications may be associated with different communication protocols and, in some implementations, may share a communication medium. As such, coexistence solutions to enable Bluetooth and WLAN communications by devices equipped with both Bluetooth and WLAN operation may be desired. For example, the central wireless device may combine feedback for the two or more peripheral wireless devices into a single group feedback message to increase the bandwidth available for Wi-Fi communications, as described in more detail with reference to FIGS. 2-6.

Figure 2:
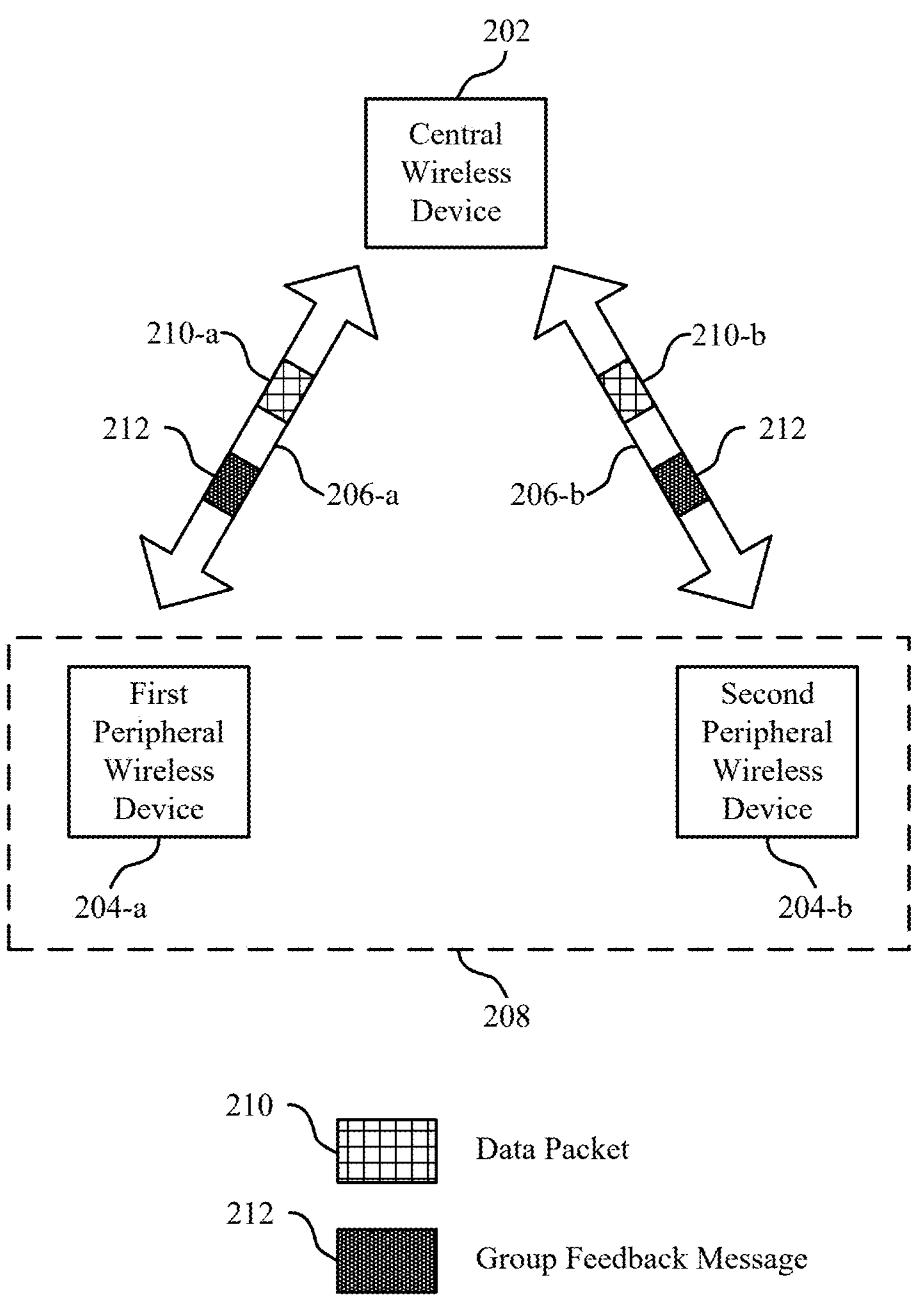
FIG. 2 shows an example of a signaling diagram that supports reduction of isochronous (ISO) bandwidth on a central wireless device.

FIG. 2 shows an example of a signaling diagram 200 that supports reduction of isochronous (ISO) bandwidth on a central wireless device. In some examples, the signaling diagram 200 may implement aspects of the wireless communications network 100. For example, the signaling diagram 200 includes a central wireless device 202, which may be an example of an AP 102 or a STA 104 described with reference to FIG. 1, a first peripheral wireless device 204-*a*, and a second peripheral wireless device 204-*b*, which may each be an example of a STA 104 described with reference to FIG. 1 or a standalone Bluetooth peripheral device.

Devices in the signaling diagram 200 may support two or more CISs 206 between the central wireless device 202 and each of the first peripheral wireless device 204-*a* and the second peripheral wireless device 204-*b*. For example, the signaling diagram 200 may illustrate a first CIS 206-*a* between the central wireless device 202 and the first peripheral wireless device 204-*a* and a second CIS 206-*b* between the central wireless device 202 and the second peripheral wireless device 204-*b*. Each CIS 206 may be bidirectional (such as the central wireless device 202 and the peripheral wireless device 204 each transmit one or more data packets 210 in an isochronous interval, as described in more detail with reference to FIG. 4) or unidirectional (such as only one of the central wireless device 202 and the peripheral wireless device 204 transmits one or more data packets 210 in the isochronous interval, as described in more detail with reference to FIG. 3).

The first peripheral wireless device 204-*a* and the second peripheral wireless device 204-*b* may belong to a CIG 208. In one example, the central wireless device 202 may be a cell phone, the first peripheral wireless device 204-*a* may be a left wireless earbud, and the second peripheral wireless device 204-*b* may be a right wireless earbud. During a phone call, the first CIS 206-*a* may carry audio data and acknowledgments between the central wireless device 202 and the first peripheral wireless device 204-*a* isochronously with (such as at the same time as, or synchronized with) the second CIS 206-*b* carrying audio data and acknowledgments between the central wireless device 202 and the second peripheral wireless device 204-*b*.

The first CIS 206-*a* and the second CIS 206-*b* may occur in an isochronous interval (such as a periodic time interval) including a quantity of subevents (such as each with a duration of 1 millisecond (ms)). Remaining subevents of the isochronous interval that may not be used for one of the CISs 206 may be used for Wi-Fi communications. For example, if an isochronous interval contains 10 subevents and 6 subevents are used for isochronous stream transmission, the remaining 4 subevents of the isochronous interval may be used for Wi-Fi communications. In some examples, one or more subevents may be used for feedback for one or more data packets 210 received by the central wireless device, thus reducing the quantity of subevents available for Wi-Fi communications and decreasing the quality and efficiency of Wi-Fi communications.

In some implementations, the first peripheral wireless device 204-*a* may transmit, and the central wireless device 202 may monitor for and receive, a first data packet 210-*a* (such as audio data) in a first subevent of the isochronous interval. The second peripheral wireless device 204-*b* may transmit, and the central wireless device 202 may monitor for and receive, a second data packet 210-*b* (such as audio data) in a second subevent of the isochronous interval. Rather than transmit separate feedback messages to the first peripheral wireless device 204-*a* and the second peripheral wireless device 204-*b* (such as in a third and fourth subevent of the isochronous interval, respectively), the central wireless device 202 may transmit (such as broadcast), in a third subevent of the isochronous interval, a group feedback message 212 (such as a special ACK) that acknowledges the first data packet 210-*a* and the second data packet 210-*b*.

In some examples, the CIG 208 may include more peripheral wireless devices 204 than the first peripheral wireless device 204-*a* and the second peripheral wireless device 204-*b*. Each peripheral wireless device 204 in the CIG 208 may transmit a data packet 210 to the central wireless device 202 and monitor for the group feedback message 212.

By combining feedback for the first data packet 210-*a* and the second data packet 210-*b* into the group feedback message 212, the central wireless device 202 may make one or more additional subevents of the isochronous interval available for transmission of Wi-Fi communications. Thus, the mechanisms described herein may improve the reliability, quality, and efficiency of Wi-Fi communications.

Figure 3:
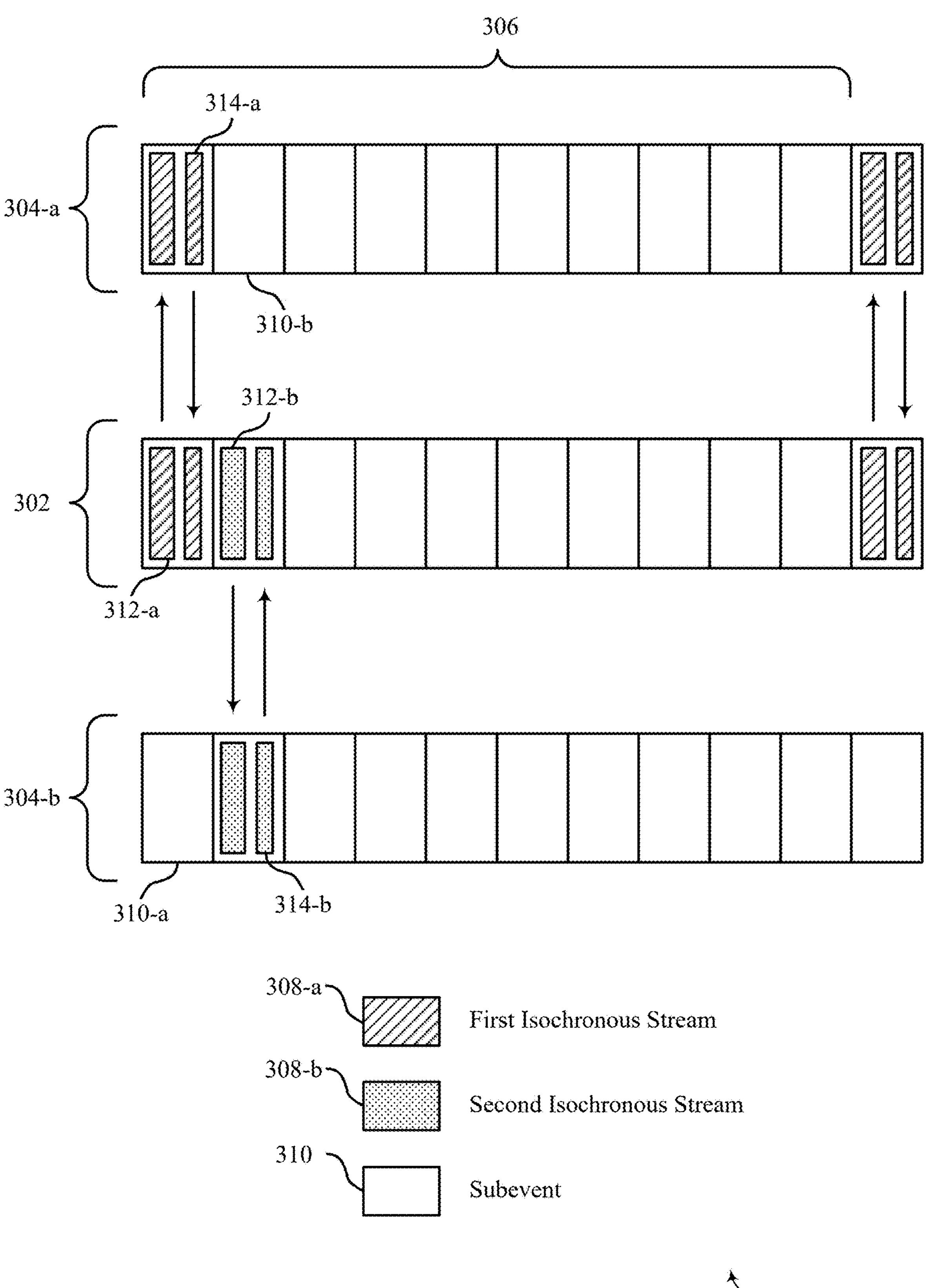
FIG. 3 shows an example of a resource diagram that illustrates ISO communications with peripheral wireless devices.

FIG. 3 shows an example of a resource diagram 300 illustrating ISO communications with peripheral wireless devices. The resource diagram 300 may implement or be implemented by one or more aspects of the wireless communications network 100 and the signaling diagram 200 described with reference to FIGS. 1 and 2, respectively. For example, the resource diagram 300 may be implemented by a central wireless device 302 (such as an AP 102, a STA 104, or the central wireless device 202) and a first peripheral wireless device 304-*a* and a second peripheral wireless device 304-*b* (such as an AP 102, a STA 104, or a peripheral wireless device 204) that belong to a CIG (such as the CIG 208) as described with reference to FIGS. 1 and 2 to support reduction of ISO bandwidth on the central wireless device.

The resource diagram 300 may illustrate an isochronous interval 306 (such as a periodic interval) for transmission of a first isochronous stream 308-*a* between the central wireless device 302 and the first peripheral wireless device 304-*a* and transmission of a second isochronous stream 308-*b* between the central wireless device 302 and the second peripheral wireless device 304-*b*. The isochronous interval 306 may contain a quantity of subevents 310 (such as 10 subevents 310, or 8 frames) that may each have a duration (such as 1 ms, such that the isochronous interval 306 may have a duration of 10 ms). Remaining subevents 310 that are not used for transmission of isochronous streams 308 (such as one or more data packets 312 and one or more feedback messages 314) may be utilized for Wi-Fi communications. When low-energy audio (LEA) runs with a relatively short isochronous interval 306 (such as 7.5 ms or 10 ms), it may be a challenge to provide large, uninterrupted bandwidth to Wi-Fi, which may increase the latency or lower the reliability of streaming Wi-Fi data. In examples where the isochronous interval 306 is fixed, isochronous streams 308 may consume enough time resources (such as subevents 310) to provide inadequate uninterrupted bandwidth to Wi-Fi communications.

The resource diagram 300 illustrates an example of unidirectional downlink traffic. For example, the first peripheral wireless device 304-*a* may be a left earbud, the second peripheral wireless device 304-*b* may be a right earbud, and the central wireless device 302 may be a mobile phone or other Bluetooth host device. The two earbuds may receive parallel audio data from the mobile phone to play simultaneously, but in this unidirectional example, neither earbud may be recording audio data for transmission to the central wireless device 302. The central wireless device 302 may transmit, to the first peripheral wireless device 304-*a*, a first data packet 312-*a* in a first subevent 310-*a* of the isochronous interval 306. The first peripheral wireless device 304-*a* may transmit, to the central wireless device 302 and in response to the first data packet 312-*a*, a first feedback message 314-*a* in the first subevent 310-*a* of the isochronous interval 306. The first feedback message 314-*a* may provide an acknowledgment that the first peripheral wireless device 304-*a* successfully received the first data packet 312-*a*. For example, the first data packet 312-*a* may include a sequence number (SN) (such as 0), and the first feedback message 314-*a* may include a next expected sequence number (NESN) (such as 1 to ACK or indicate that the first peripheral wireless device 304-*a* successfully received the first data packet 312-*a*, or 0 to NACK). That is, the first feedback message 314-*a* may ACK the first data packet 312-*a* if the NESN is the same as the SN in the first data packet 312-*a*. Additionally, or alternatively, the first feedback message 314-*a* may NACK the first data packet 312-*a* if the NESN is different from the SN in the first data packet 312-*a*. The first data packet 312-*a* and the first feedback message 314-*a* may both be transmitted in the first subevent 310-*a* of the isochronous interval 306.

The central wireless device 302 may transmit, to the second peripheral wireless device 304-*b*, a second data packet 312-*b* in a second subevent 310-*b* of the isochronous interval 306. The second peripheral wireless device 304-*b* may transmit, to the central wireless device 302 and in response to the second data packet 312-*b*, a second feedback message 314-*b* in the second subevent 310-*b* of the isochronous interval 306. The second feedback message 314-*b* may provide an acknowledgment that the second peripheral wireless device 304-*b* successfully received the second data packet 312-*b*. For example, the second data packet 312-*b* may include an SN (such as 0), and the second feedback message 314-*b* may include an NESN (such as 1 to ACK or indicate that the second peripheral wireless device 304-*b* successfully received the second data packet 312-*b*, or 0 to NACK). That is, the second feedback message 314-*b* may ACK the second data packet 312-*b* if the NESN is the same as the SN in the second data packet 312-*b*. Additionally, or alternatively, the second feedback message 314-*b* may NACK the second data packet 312-*b* if the NESN is different from the SN in the second data packet 312-*b*. The second data packet 312-*b* and the second feedback message 314-*b* may both be transmitted in the second subevent 310-*b* of the isochronous interval 306.

In the example unidirectional downlink traffic with two isochronous streams 308 illustrated by the resource diagram 300, each subevent 310 may have a duration of 1 ms. Thus, the isochronous streams 308 may consume 2 ms (such as the first subevent 310-*a* and the second subevent 310-*b*) out of the 10 ms of each periodic isochronous interval 306, in a good case (such as the two isochronous streams 308 may consume more than 2 ms per isochronous interval 306). The remaining 8 ms of the isochronous interval 306 may be provided for Wi-Fi operations.

While the resource diagram 300 illustrates an example of unidirectional downlink traffic between the central wireless device 302 and two peripheral wireless devices 304 of a CIG, more than two peripheral wireless devices 304 may be part of the CIG and may consume more subevents 310 of the isochronous interval 306, leaving less uninterrupted bandwidth for Wi-Fi communications. Additionally, or alternatively, the central wireless device 302 and the two or more peripheral wireless devices 304 of the CIG may support bidirectional isochronous streams 308, as described in more detail with reference to FIG. 4. To provide more uninterrupted time resources for Wi-Fi communications, the central wireless device 302 may transmit a group feedback message that ACKs data packets from both the first peripheral wireless device 304-*a* and the second peripheral wireless device 304-*b* (such as in a unidirectional uplink traffic example, or a bidirectional traffic example), as described in more detail with reference to FIGS. 2, 5, and 6.

Figure 4:
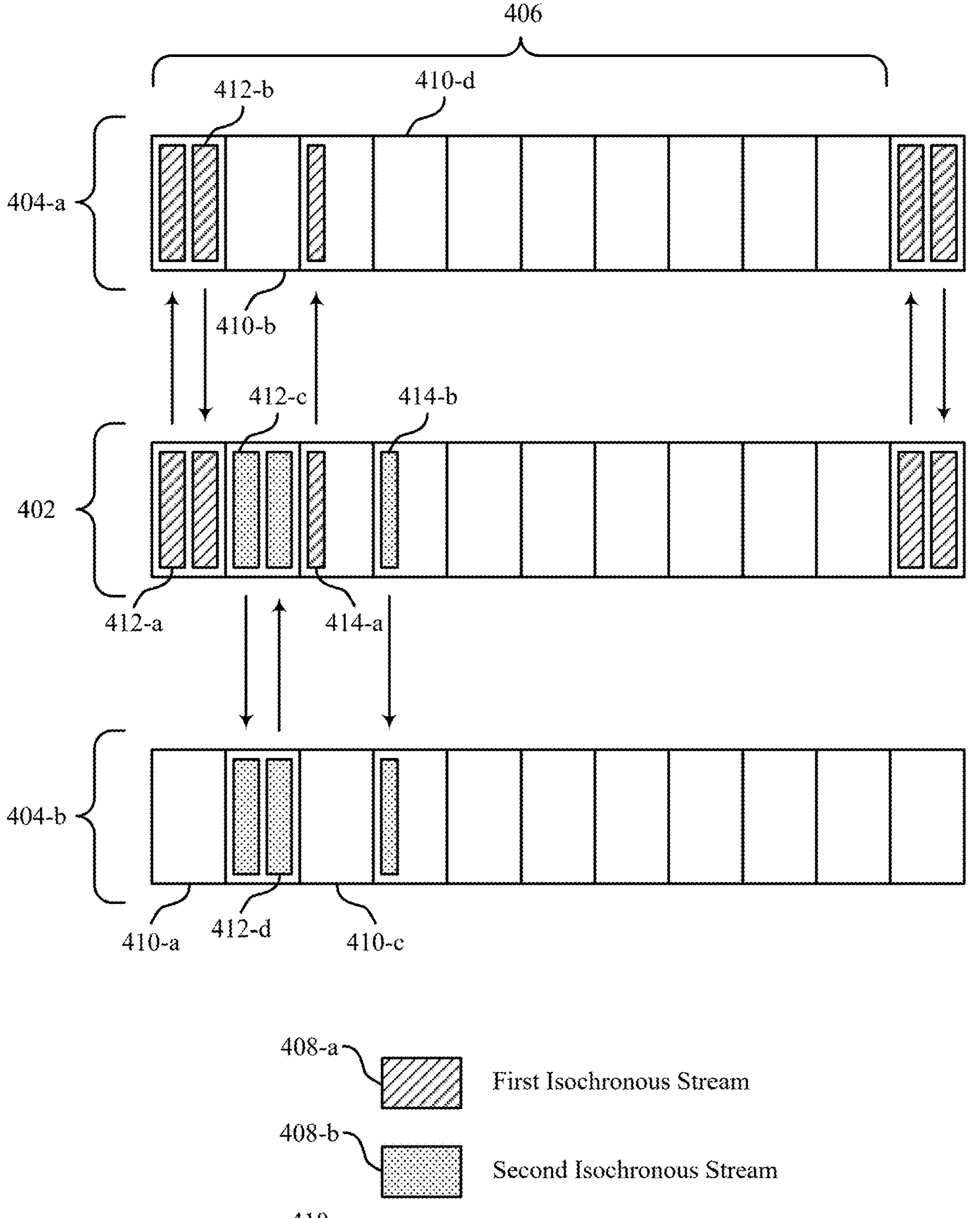
FIG. 4 shows an example of a resource diagram that illustrates ISO communications with peripheral wireless devices.

FIG. 4 shows an example of a resource diagram 400 that illustrating ISO communications with peripheral wireless devices. The resource diagram 400 may implement or be implemented by one or more aspects of the wireless communications network 100 and the signaling diagram 200 described with reference to FIGS. 1 and 2, respectively. For example, the resource diagram 400 may represent communications between a central wireless device 402 (such as an AP 102, a STA 104, or the central wireless device 202), and a first peripheral wireless device 404-*a* (such as an AP 102, a STA 104, or a peripheral wireless device 204), and a second peripheral wireless device 404-*b* (such as an AP 102, a STA 104, or a peripheral wireless device 204) that belong to a CIG (such as the CIG 208) as described with reference to FIGS. 1 and 2 to support reduction of ISO bandwidth on the central wireless device.

The resource diagram 400 may illustrate bidirectional traffic. For example, the first peripheral wireless device 404-*a* may be a left earbud and the second peripheral wireless device 404-*b* may be a right ear bud, where each earbud receives and transmits audio data (such as during a call). The central wireless device 402 may transmit, to the first peripheral wireless device 404-*a*, a first data packet 412-*a* in a first subevent 410-*a* of the isochronous interval 406. The first peripheral wireless device 404-*a* may transmit, to the central wireless device 402, a second data packet 412-*b* in the first subevent 410-*a* of the isochronous interval 406. The second data packet 412-*b* may contain feedback for the first data packet 412-*a*. For example, the first data packet 412-*a* may include a sequence number (SN) (such as 0), and the second data packet 412-*b* may include a next expected sequence number (NESN) (such as 1 to ACK or indicate that the first peripheral wireless device 404-*a* successfully received the first data packet 412-*a*, or 0 to NACK). That is, the second data packet 412-*b* may ACK the first data packet 412-*a* if the NESN is the same as the SN in the first data packet 412-*a*. Additionally, or alternatively, the second data packet 412-*b* may NACK the first data packet 412-*a* if the NESN is different from the SN in the first data packet 412-*a*. The first data packet 412-*a* and the second data packet 412-*b* may both be transmitted in the first subevent 410-*a* of the isochronous interval 406.

The central wireless device 402 may transmit, to the second peripheral wireless device 404-*b*, a third data packet 412-*c* in a second subevent 410-*b* of the isochronous interval 406. The second peripheral wireless device 404-*b* may transmit, to the central wireless device 402 and in response to the third data packet 412-*c*, a fourth data packet 412-*d* in the second subevent 410-*b* of the isochronous interval 406. The fourth data packet 412-*d* may provide an acknowledgment that the second peripheral wireless device 404-*b* successfully received the third data packet 412-*c*. For example, the third data packet 412-*c* may include an SN (such as 0), and the fourth data packet 412-*d* may include an NESN (such as 1 to ACK or indicate that the second peripheral wireless device 404-*b* successfully received the third data packet 412-*c*, or 0 to NACK). That is, the fourth data packet 412-*d* may ACK the third data packet 412-*c* if the NESN is the same as the SN in the third data packet 412-*c*. Additionally, or alternatively, the fourth data packet 412-*d* may NACK the third data packet 412-*c* if the NESN is different from the SN in the third data packet 412-*c*. The third data packet 412-*c* and the fourth data packet 412-*d* may both be transmitted in the second subevent 410-*b* of the isochronous interval 406.

The central wireless device 402 may transmit, to the first peripheral wireless device 404-*a*, a first feedback message 414-*a* in the third subevent 410-*c* of the isochronous interval 406. The first feedback message 414-*a* may contain feedback for the second data packet 412-*b*. For example, the second data packet 412-*b* may include an SN (such as 0), and the first feedback message 414-*a* may include an NESN (such as 1 to ACK or indicate that the central wireless device 402 successfully received the second data packet 412-*b*, or 0 to NACK). That is, the first feedback message 414-*a* may ACK the second data packet 412-*b* if the NESN is the same as the SN in the second data packet 412-*b*. Additionally, or alternatively, the first feedback message 414-*a* may NACK the second data packet 412-*b* if the NESN is different from the SN in the second data packet 412-*b*. The first feedback message 414-*a* may consume the entirety of the third subevent 410-*c*.

The central wireless device 402 may transmit, to the second peripheral wireless device 404-*b*, a second feedback message 414-*b* in the fourth subevent 410-*d* of the isochronous interval 406. The second feedback message 414-*b* may contain feedback for the fourth data packet 412-*d*. For example, the fourth data packet 412-*d* may include an SN (such as 0), and the second feedback message 414-*b* may include an NESN (such as 1 to ACK or indicate that the central wireless device 402 successfully received the fourth data packet 412-*d*, or 0 to NACK). That is, the second feedback message 414-*b* may ACK the fourth data packet 412-*d* if the NESN is the same as the SN in the fourth data packet 412-*d*. Additionally, or alternatively, the second feedback message 414-*b* may NACK the fourth data packet 412-*d* if the NESN is different from the SN in the fourth data packet 412-*d*. The second feedback message 414-*b* may consume 300 microseconds (μs).

In the example bidirectional traffic with two isochronous streams 408 illustrated by the resource diagram 400, each subevent 410 may have a duration of 1 ms. The Wi-Fi bandwidth shortages may be relatively worse in a bidirectional stream compared to a unidirectional stream. For example, the first feedback message 414-*a* may consume an extra subevent 410 (such as the entire duration of the third subevent 410-*c*) and the second feedback message 414-*b* may consume around 300 μs of the fourth subevent 410-*d*. Thus, the first isochronous stream 408-*a* and the second isochronous stream 408-*b* may consume 3.30 ms (such as across the first four subevents 410-*a*, 410-*b*, 410-*c*, and 410-*d*) out of the 10 ms of each periodic isochronous interval 406, even when the packet exchange (such as transmission of data packets 412-*a*, 412-*b*, 412-*c*, and 412-*d*) occurred within the first 2 ms (such as the first subevent 410-*a* and the second subevent 410-*b*) of the isochronous interval 406. In some examples, the two isochronous streams 408 may consume more than 3.30 ms per isochronous interval 406. The remaining 6.70 ms of the isochronous interval 406 may be provided for Wi-Fi operations.

The central wireless device 402 may not refrain from transmitting an ACK (such as a feedback message) in response to the second data packet 412-*b* (such as that is not a viable option) because the first peripheral wireless device 404-*a* may schedule all remaining subevents 410 monitoring for the feedback, which may cause issues in peripheral scheduling and leave no bandwidth available for Wi-Fi communications.

While the resource diagram 400 illustrates an example of bidirectional traffic between the central wireless device 402 and two peripheral wireless devices 404 of a CIG, more than two peripheral wireless devices 404 may be part of the CIG and may consume more subevents 410 of the isochronous interval 406, leaving even less uninterrupted bandwidth (such as fewer subevents 410) for Wi-Fi communications. For example, four peripheral wireless devices 404 in the CIG may consume more than 7 subevents 410 of the isochronous interval 406, leaving less than 3 remaining subevents 410 available for Wi-Fi communications. To provide more uninterrupted time resources for Wi-Fi communications, the central wireless device 402 may transmit a group feedback message that ACKs both the second data packet 412-*b* from the first peripheral wireless device 404-*a* and the fourth data packet 412-*d* from the second peripheral wireless device 404-*b*, as described in more detail with reference to FIGS. 2, 5, and 6.

Figure 5:
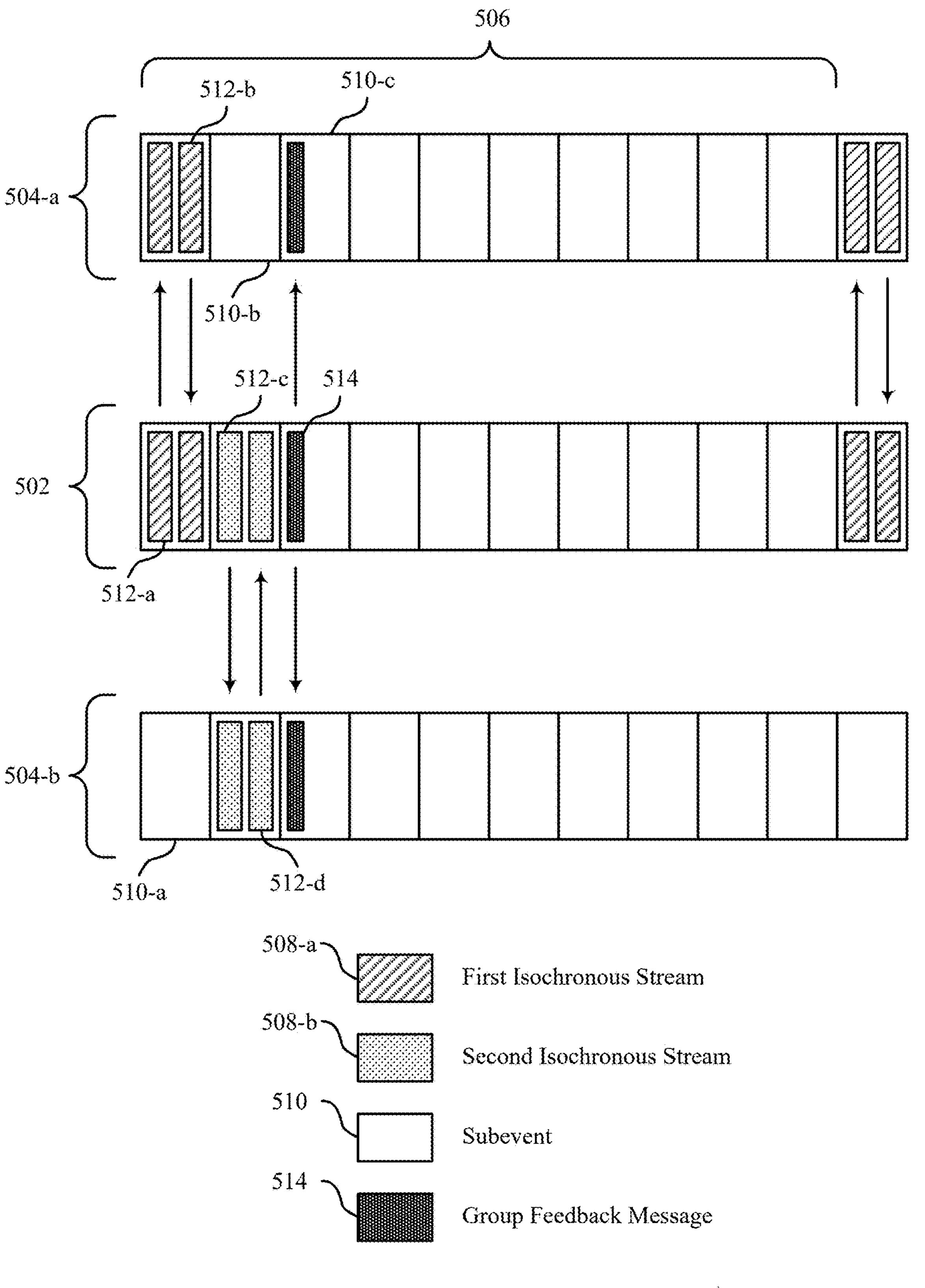
FIG. 5 shows an example of a resource diagram that supports reduction of ISO bandwidth on a central wireless device.

FIG. 5 shows an example of a resource diagram 500 that supports reduction of ISO bandwidth on a central wireless device. The resource diagram 500 may implement or be implemented by one or more aspects of the wireless communications network 100 and the signaling diagram 200 described with reference to FIGS. 1 and 2, respectively. For example, the resource diagram 500 may be implemented by a central wireless device 502 (such as an AP 102, a STA 104, or the central wireless device 202) and a first peripheral wireless device 504-*a* and a second peripheral wireless device 504-*b* (such as an AP 102, a STA 104, or a peripheral wireless device 204) that belong to a CIG (such as the CIG 208) as described with reference to FIGS. 1 and 2 to support reduction of ISO bandwidth on the central wireless device.

The resource diagram 500 may illustrate an isochronous interval 506 (such as a periodic interval) for transmission of a first isochronous stream 508-*a* between the central wireless device 502 and the first peripheral wireless device 504-*a* and transmission of a second isochronous stream 508-*b* between the central wireless device 502 and the second peripheral wireless device 504-*b*. The isochronous interval 506 may contain a quantity of subevents 510 (such as 10 subevents 510, or 8 frames) that may each have a duration (such as 1 ms, such that the isochronous interval 506 may have a duration of 10 ms). Remaining subevents 510 that are not used for transmission of isochronous streams 508 (such as one or more data packets 512 and one or more feedback messages 515) may be utilized for Wi-Fi communications. When LEA runs with a relatively short isochronous interval 506 (such as 7.5 ms or 10 ms), it may be a challenge to provide large, uninterrupted bandwidth to Wi-Fi, which may cause issues in streaming reliable Wi-Fi data. This may not be an issue with the A2DP Bluetooth profile, which runs without a fixed isochronous interval 506. However, in examples where the isochronous interval 506 is fixed, isochronous streams 508 may consume enough time resources (such as subevents 510) to provide inadequate uninterrupted bandwidth to Wi-Fi communications. Solutions that allow isochronous data transmission and feedback while maximizing time resources available for Wi-Fi communications may be desired.

For example, the central wireless device 502 may utilize the resource diagram 500 for transmission of a special ACK feedback message (such as the group feedback message 514) that may ACK all isochronous streams 508 for all peripheral wireless devices 504 in the CIG. All receivers in the CIG (such as the peripheral wireless devices 504) may listen to the special ACK feedback message. This may be easy to implement with a split CIG mechanism in place (such as two ear buds) as both ear buds (such as peripheral wireless devices 504) may listen for this special ACK feedback message.

The central wireless device 502 may transmit, to the first peripheral wireless device 504-*a*, a first data packet 512-*a* in a first subevent 510-*a* of the isochronous interval 506. The first peripheral wireless device 504-*a* may transmit, to the central wireless device 502, a second data packet 512-*b* in the first subevent 510-*a* of the isochronous interval 506. The central wireless device 502 may monitor for and receive the second data packet 512-*b* in the first subevent 510-*a* of the isochronous interval 506. The second data packet 512-*b* may contain feedback for the first data packet 512-*a*. For example, the first data packet 512-*a* may include (such as be associated with) a sequence number (SN) (such as 0), and the second data packet 512-*b* may include (such as be associated with) a next expected sequence number (NESN) (such as 1 to ACK or indicate that the first peripheral wireless device 504-*a* successfully received the first data packet 512-*a*, or 0 to NACK). That is, the second data packet 512-*b* may ACK the first data packet 512-*a* by including an NESN that is the same as the SN in the first data packet 512-*a*. Additionally, or alternatively, the second data packet 512-*b* may NACK the first data packet 512-*a* by including an NESN that is different from the SN in the first data packet 512-*a*. The first data packet 512-*a* and the second data packet 512-*b* may both be transmitted in the first subevent 510-*a* of the isochronous interval 506.

The central wireless device 502 may transmit, to the second peripheral wireless device 504-*b*, a third data packet 512-*c* in a second subevent 510-*b* of the isochronous interval 506. The second peripheral wireless device 504-*b* may transmit, to the central wireless device 502 and in response to the third data packet 512-*c*, a fourth data packet 512-*d* in the second subevent 510-*b* of the isochronous interval 506. The central wireless device 502 may monitor for and receive the fourth data packet 512-*d* in the second subevent 510-*b* of the isochronous interval 506. The fourth data packet 512-*d* may provide an acknowledgment that the second peripheral wireless device 504-*b* successfully received the third data packet 512-*c*. For example, the third data packet 512-*c* may include an SN (such as 0), and the fourth data packet 512-*d* may include an NESN (such as 1 to ACK or indicate that the second peripheral wireless device 504-*b* successfully received the third data packet 512-*c*, or 0 to NACK). That is, the fourth data packet 512-*d* may ACK the third data packet 512-*c* by including an NESN that is the same as the SN in the third data packet 512-*c*. Additionally, or alternatively, the fourth data packet 512-*d* may NACK the third data packet 512-*c* by including an NESN that is different from the SN in the third data packet 512-*c*. The third data packet 512-*c* and the fourth data packet 512-*d* may both be transmitted in the second subevent 510-*b* of the isochronous interval 506.

In a third subevent 510-*c* of the isochronous interval 506, the central wireless device 502 may transmit, to both the first peripheral wireless device 504-*a* and the second peripheral wireless device 504-*b* (such as all peripheral wireless devices 504 in the CIG), a group feedback message 514 based on the central wireless device 502 monitoring for the second data packet 512-*b* and the fourth data packet 512-*d*. The group feedback message 514 may contain feedback for (such as corresponding to) the second data packet 512-*b* and the fourth data packet 512-*d* (such as each data packet 512 received by the central wireless device 502 in the isochronous interval 506). For example, the second data packet 512-*b* may be associated with a first SN (such as 0), and the group feedback message 514 may include a first NESN (such as 1 to ACK or indicate that the central wireless device 502 successfully received the second data packet 512-*b*, or 0 to NACK). That is, the group feedback message 514 may ACK the second data packet 512-*b* if the first NESN is the same as the first SN in the second data packet 512-*b*. Additionally, or alternatively, the group feedback message 514 may NACK the second data packet 512-*b* if the first NESN is different from the first SN in the second data packet

512-*b*. The fourth data packet 512-*d* may be associated with a second SN (such as 0), and the group feedback message 514 may include a second NESN (such as 1 to ACK or indicate that the central wireless device 502 successfully received the fourth data packet 512-*d*, or 0 to NACK). That is, the group feedback message 514 may ACK the fourth data packet 512-*d* if the second NESN is the same as the second SN in the fourth data packet 512-*d*. Additionally, or alternatively, the group feedback message 514 may NACK the fourth data packet 512-*d* if the second NESN is different from the second SN in the fourth data packet 512-*d*.

In some examples, the group feedback message 514 may include a single bit that indicates ACK information for both the first peripheral wireless device 504-*a* and the second peripheral wireless device 504-*b*. Additionally, or alternatively, the group feedback message 514 may include a bitmap that indicates ACK information for both the first peripheral wireless device 504-*a* and the second peripheral wireless device 504-*b*. The bitmap may indicate whether the central wireless device 502 successfully received the second data packet 512-*b*, the fourth data packet 512-*d*, or both. The size of the bitmap may be based on a quantity of peripheral wireless devices 504 in the CIG. For example, each index in the bitmap may correspond to one peripheral wireless device 504 in the CIG.

In some examples, each of the first peripheral wireless device 504-*a* and the second peripheral wireless device 504-*b* may be associated with a respective frequency hopping pattern. The central wireless device 502 may transmit the group feedback message 514 in accordance with the frequency hopping pattern of one or both of the first peripheral wireless device 504-*a* or the second peripheral wireless device 504-*b*. In some examples, the central wireless device 502 may transmit, to the first peripheral wireless device 504-*a* and the second peripheral wireless device 504-*b*, an indication of which frequency hopping pattern to monitor for the group feedback message 514.

In some examples, the first peripheral wireless device 504-*a* may be associated with a first set of one or more subevents 510 of the isochronous interval 506 (such as the subevents 510-*a*, 510-*c*, and other subevents 510 associated with the first isochronous stream 508-*a*). Similarly, the second peripheral wireless device 504-*b* may be associated with a second set of one or more subevents 510 of the isochronous interval 506 (such as the subevent 510-*b* and other subevents 510 associated with the second isochronous stream 508-*b*). The first set of one or more subevents 510 and the second set of one or more subevents 510 may be interleaved, where the subevents 510 may alternate between the isochronous streams 508-*a* and 508-*b* and the peripheral wireless devices 504-*a* and 504-*b* in the CIG, respectively. The third subevent 510-*c* of the isochronous interval 506 (such as in which the group feedback message 514 may be transmitted) may be associated with one of the first set of one or more subevents 510 or the second set of one or more subevents 510. In the example illustrated by the resource diagram 500, the group feedback message 514 may be transmitted in the first set of one or more subevents 510 associated with the first peripheral wireless device 504-*a* and the first isochronous stream 508-*a*. In some examples, the central wireless device 502 may transmit, to the first peripheral wireless device 504-*a*, the second peripheral wireless device 504-*b*, or both, an indication of which of the first set of one or more subevents 510 or the second set of one or more subevents 510 to monitor for the group feedback message 514.

In some examples, the ACK information included in the group feedback message 514 may include a negative acknowledgment (such as a first NESN in the group feedback message 514 that matches or is the same as the first SN in the second data packet 512-*b*) for the second data packet 512-*b*. The first peripheral wireless device 504-*a* may transmit, and the central wireless device 502 may monitor for and receive, a retransmission of the second data packet 512-*b* based on the ACK information in the group feedback message 514 including a negative acknowledgment for the second data packet 512-*b*. The retransmission of the second data packet 512-*b* may occur in a fourth subevent 510 of the set of multiple isochronous subevents 510 of the isochronous interval 506. The central wireless device 502 may transmit, in the fourth subevent 510 of the set of multiple isochronous subevents 510 of the isochronous interval 506, a feedback message based on monitoring for the retransmission.

While the resource diagram 500 illustrates a group feedback message 514 that ACKs multiple uplink data packets 512 in a bidirectional traffic example, the group feedback message also may ACK uplink data packets in a unidirectional uplink traffic example, in which the first peripheral wireless device 504-*a* and the second peripheral wireless device 504-*b* may each transmit a data packet 512 to the central wireless device 502, but the central wireless device 502 may not have one or more data packets 512 to transmit to the first peripheral wireless device 504-*a* and the second peripheral wireless device 504-*b*.

In the example bidirectional traffic with two isochronous streams 508-*a* and 508-*b* illustrated by the resource diagram 500, each subevent 510 may have a duration of 1 ms. The central wireless device 502 may save 1 ms of bandwidth in every isochronous interval 506 (such as made available for Wi-Fi communications), compared to a central wireless device that does not employ the group feedback message 514 (such as the central wireless device 402 described in more detail with reference to FIG. 4). For example, the group feedback message 514 may consume around 300 μs of the third subevent 510-*c*. Thus, the first isochronous stream 508-*a* and the second isochronous stream 508-*b* may consume a total of 2.30 ms (such as across the first three subevents 510-*a*, 510-*b*, and 510-*c*) out of the 10 ms of each periodic isochronous interval 506, compared to the 3.30 ms consumed by the central wireless device 402 that did not use a group feedback message, as described in more detail with reference to FIG. 4. The remaining 7.70 ms of the isochronous interval 506 may be provided for Wi-Fi operations. The amount of bandwidth saved by implementing the group feedback message 514 may become significant when the duration of the subevents 510 become large (such as greater than 1 ms), for example, as the central wireless device 502 and the peripheral wireless devices 504 transfer large packets for high data rate audio. The amount of bandwidth saved by implementing the group feedback message 514 also may become significant when the central wireless device 502 supports more than 2 isochronous stream 508, for example, as part of multi-channel audio.

Figure 6:
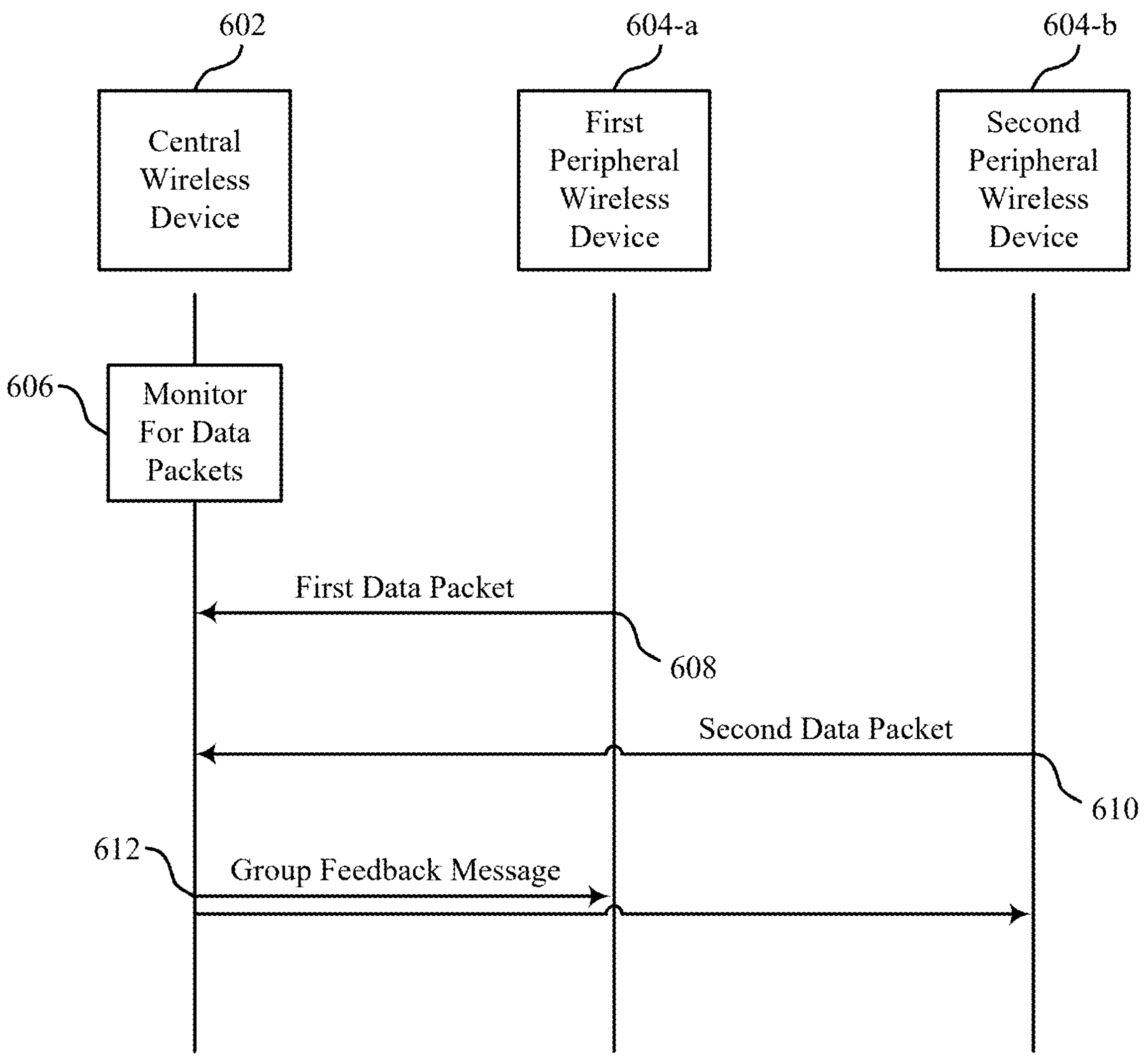
FIG. 6 shows an example of a process flow that supports reduction of ISO bandwidth on a central wireless device.

FIG. 6 shows an example of a process flow 600 that supports reduction of ISO bandwidth on a central wireless device. In some examples, the process flow 600 may be implemented by, or may implement aspects of, the wireless communications network 100, the signaling diagram 200, and resource diagrams 300, 400, and 500. For example, the process flow 600 includes a central wireless device 602 (such as an AP 102, a STA 104, or the central wireless device 202) and a first peripheral wireless device 604-*a* and a second peripheral wireless device 604-*b* (such as APs 102, STAs 104, or peripheral wireless devices 204) that belong to a CIG (such as the CIG 208) as described with reference to FIGS. 1 and 2 to support reduction of ISO bandwidth on the central wireless device. Following the process flow 600, the central wireless device 602 may utilize a group feedback message to increase Wi-Fi bandwidth. Alternative examples of the following may be implemented, where some steps are performed in a different order than described or are not performed at all. In some examples, steps may include additional features not mentioned below, or further steps may be added. Although the central wireless device 602, the first peripheral wireless device 604-*a*, and the second peripheral wireless device 604-*b* are shown performing the operations of the process flow 600, some aspects of some operations also may be performed by one or more other wireless devices.

At 606, the central wireless device 602 may monitor, in a first subevent of a set of multiple isochronous subevents of an isochronous interval, for a first data packet from the first peripheral wireless device 604-*a*. Additionally, or alternatively, the central wireless device 602 may monitor, in a second subevent of the set of multiple isochronous subevents of the isochronous interval, for a second data packet from the second peripheral wireless device 604-*b*. The first data packet may be associated with a first sequence number (SN) (such as 0) and the second data packet may be associated with a second SN (such as 1).

At 608, the first peripheral wireless device 604-*a* may transmit, and the central wireless device 602 may receive, in the first subevent of the set of multiple isochronous subevents of the isochronous interval, the first data packet associated with the first SN.

At 610, the second peripheral wireless device 604-*b* may transmit, and the central wireless device 602 may receive, in the second subevent of the set of multiple isochronous subevents of the isochronous interval, the second data packet associated with the second SN.

At 612, the central wireless device 602 may transmit, and the first peripheral wireless device 604-*a* and the second peripheral wireless device 604-*b* of the CIG may monitor for and receive, in a third subevent of the set of multiple isochronous subevents of the isochronous interval, a group feedback message based on the monitoring. The group feedback message may include acknowledgment information corresponding to the first data packet and the second data packet. For example, the acknowledgment information may include a first next expected sequence number (NESN) for the first peripheral wireless device 604-*a* and a second NESN for the second peripheral wireless device 604-*b*. The acknowledgment information may ACK the first data packet by including a first NESN (such as 1) that is different from the first SN in the first data packet. The acknowledgment information may NACK the first data packet by including a first NESN (such as 0) that is the same as the first SN in the first data packet. Similarly, the acknowledgment information may ACK the second data packet by including a second NESN (such as 0) that is different from the second SN in the second data packet. The acknowledgment information may NACK the second data packet by including a second NESN (such as 1) that is the same as the second SN in the second data packet.

In some examples, the group feedback message may include a single bit that indicates acknowledgment information for both the first peripheral wireless device 604-*a* and the second peripheral wireless device 604-*b*. Additionally, or alternatively, the group feedback message may include a bitmap that indicates acknowledgment information for both the first peripheral wireless device 604-*a* and the second peripheral wireless device 604-*b*. The bitmap may indicate whether the central wireless device 602 successfully received the first data packet, the second data packet, or both.

In some examples, each of the first peripheral wireless device 604-*a* and the second peripheral wireless device 604-*b* may be associated with a respective frequency hopping pattern. The central wireless device 602 may transmit the group feedback message in accordance with the frequency hopping pattern of one or both of the first peripheral wireless device 604-*a* or the second peripheral wireless device 604-*b*. In some examples, the central wireless device 602 may transmit, to the first peripheral wireless device 604-*a* and the second peripheral wireless device 604-*b*, an indication of which frequency hopping pattern to monitor for the group feedback message.

In some examples, the first peripheral wireless device 604-*a* may be associated with a first set of one or more subevents of the isochronous interval. Similarly, the second peripheral wireless device 604-*b* may be associated with a second set of one or more subevents of the isochronous interval. The third subevent of the isochronous interval (such as in which the group feedback message may be transmitted) may be associated with one of the first set of one or more subevents or the second set of one or more subevents. That is, the group feedback message may be transmitted in a subevent associated with the first peripheral wireless device 604-*a* or a subevent associated with the second peripheral wireless device 604-*b*. The central wireless device 602 may transmit, to the first peripheral wireless device 604-*a*, the second peripheral wireless device 604-*b*, or both, an indication of which of the first set of one or more subevents or the second set of one or more subevents to monitor for the group feedback message.

In some examples, the acknowledgment information may include a negative acknowledgment (such as a first NESN that matches the first SN) for the first data packet. The first peripheral wireless device 604-*a* may transmit, and the central wireless device 602 may monitor for and receive, a retransmission of the first data packet based on the acknowledgment information in the group feedback message including a negative acknowledgment for the first data packet. The retransmission of the first data packet may occur in a fourth subevent of the set of multiple isochronous subevents of the isochronous interval. The central wireless device 602 may transmit, in the fourth subevent of the set of multiple isochronous subevents of the isochronous interval, a feedback message based on monitoring for the retransmission.

FIG. 7 shows a block diagram 700 of a central wireless device 720 that supports reduction of ISO bandwidth on a central wireless device. The central wireless device 720 may be an example of aspects of a central wireless device as described with reference to FIGS. 1 through 6. The central wireless device 720, or various components thereof, may be an example of means for performing various aspects of reduction of ISO bandwidth on a central wireless device as described herein. For example, the central wireless device 720 may include a data packet manager 725 a feedback manager 730, or any combination thereof. Each of these components, or components or subcomponents thereof (such as one or more processors, one or more memories), may communicate, directly or indirectly, with one another (such as via one or more buses).

The central wireless device 720 may support wireless communications in accordance with examples as disclosed herein. The data packet manager 725 is configurable or configured to monitor, in a first subevent of a set of multiple isochronous subevents of an isochronous interval, for a first data packet from a first peripheral wireless device of a set of multiple peripheral wireless devices in a CIG, the first data packet associated with a first SN. In some examples, the data packet manager 725 is configurable or configured to monitor, in a second subevent of the set of multiple isochronous subevents of the isochronous interval, for a second data packet from a second peripheral wireless device of the set of multiple peripheral wireless devices in the CIG, the second data packet associated with a second SN. The feedback manager 730 is configurable or configured to transmit, in a third subevent of the set of multiple isochronous subevents of the isochronous interval and to the set of multiple peripheral wireless devices in the CIG, a group feedback message based on the monitoring, where the group feedback message includes acknowledgment information corresponding to the first data packet and the second data packet.

In some examples, to support transmitting the group feedback message, the feedback manager 730 is configurable or configured to transmit a single bit that indicates acknowledgment information for both the first peripheral wireless device and the second peripheral wireless device.

In some examples, to support transmitting the group feedback message, the feedback manager 730 is configurable or configured to transmit a bitmap that includes acknowledgment information for the first peripheral wireless device and acknowledgment information for the second peripheral wireless device, the bitmap indicating whether the central wireless device successfully received the first data packet, the second data packet, or both.

In some examples, each of the first peripheral wireless device and the second peripheral wireless device is associated with a respective frequency hopping pattern, and the group feedback message is transmitted in accordance with the frequency hopping pattern of one or both of the first peripheral wireless device or the second peripheral wireless device.

In some examples, the feedback manager 730 is configurable or configured to transmit an indication of which frequency hopping pattern to monitor for the group feedback message.

In some examples, the first peripheral wireless device is associated with a first set of one or more subevents of the isochronous interval and the second peripheral wireless device is associated with a second set of one or more subevents of the isochronous interval, and the third subevent is associated with one of the first set of one or more subevents or the second set of one or more subevents.

In some examples, the feedback manager 730 is configurable or configured to transmit an indication of which of the first set of one or more subevents or the second set of one or more subevents to monitor for the group feedback message.

In some examples, the acknowledgment information includes a first NESN for the first peripheral wireless device and a second NESN for the second peripheral wireless device.

In some examples, the data packet manager 725 is configurable or configured to monitor, in a fourth subevent of the set of multiple isochronous subevents of the isochronous interval, for a retransmission of the first data packet from the first peripheral wireless device of the set of multiple peripheral wireless devices in the CIG based on the acknowledgment information including a negative acknowledgment for the first data packet. In some examples, the feedback manager 730 is configurable or configured to transmit, in the fourth subevent of the set of multiple isochronous subevents of the isochronous interval, a feedback message based on the monitoring.

FIG. 8 shows a block diagram 800 of a peripheral wireless device 820 that supports reduction of ISO bandwidth on a central wireless device. The peripheral wireless device 820 may be an example of aspects of a peripheral wireless device as described with reference to FIGS. 1 through 6. The peripheral wireless device 820, or various components thereof, may be an example of means for performing various aspects of reduction of ISO bandwidth on a central wireless device as described herein. For example, the peripheral wireless device 820 may include a data packet component 825 a feedback component 830, or any combination thereof. Each of these components, or components or subcomponents thereof (such as one or more processors, one or more memories), may communicate, directly or indirectly, with one another (such as via one or more buses).

The peripheral wireless device 820 may support wireless communications in accordance with examples as disclosed herein. The data packet component 825 is configurable or configured to transmit, in a first subevent of a set of multiple isochronous subevents of an isochronous interval, a first data packet associated with a first SN. The feedback component 830 is configurable or configured to receive, in a second subevent of the set of multiple isochronous subevents of the isochronous interval, a group feedback message based on transmitting the first data packet, where the group feedback message includes acknowledgment information corresponding to the first data packet and a second data packet from a second peripheral wireless device of the set of multiple peripheral wireless devices in the CIG.

In some examples, to support receiving the group feedback message, the feedback component 830 is configurable or configured to receive a single bit that indicates acknowledgment information for both the first peripheral wireless device and the second peripheral wireless device.

In some examples, to support receiving the group feedback message, the feedback component 830 is configurable or configured to receive a bitmap that includes acknowledgment information for the first peripheral wireless device and acknowledgment information for the second peripheral wireless device, the bitmap indicating whether the first data packet, the second data packet, or both was successfully received.

In some examples, each of the first peripheral wireless device and the second peripheral wireless device is associated with a respective frequency hopping pattern, and the group feedback message is received in accordance with the frequency hopping pattern of one or both of the first peripheral wireless device or the second peripheral wireless device.

In some examples, the feedback component 830 is configurable or configured to receive an indication of which frequency hopping pattern to monitor for the group feedback message.

In some examples, the first peripheral wireless device is associated with a first set of one or more subevents of the isochronous interval and the second peripheral wireless device is associated with a second set of one or more subevents of the isochronous interval, and the second subevent is associated with one of the first set of one or more subevents or the second set of one or more subevents.

In some examples, the feedback component 830 is configurable or configured to receive an indication of which of the first set of one or more subevents or the second set of one or more subevents to monitor for the group feedback message.

In some examples, the acknowledgment information includes a first NESN for the first peripheral wireless device and a second NESN for the second peripheral wireless device.

In some examples, the data packet component 825 is configurable or configured to transmit, in a fourth subevent of the set of multiple isochronous subevents of the isochronous interval, a retransmission of the first data packet based on the acknowledgment information including a negative acknowledgment for the first data packet. In some examples, the feedback component 830 is configurable or configured to receive, in the fourth subevent of the set of multiple isochronous subevents of the isochronous interval, a feedback message based on the retransmission.

FIG. 9 shows a flowchart illustrating a method 900 that supports reduction of ISO bandwidth on a central wireless device. The operations of the method 900 may be implemented by a central wireless device or its components as described herein. For example, the operations of the method 900 may be performed by a central wireless device as described with reference to FIGS. 1 through 7. In some examples, a central wireless device may execute a set of instructions to control the functional elements of the central wireless device to perform the described functions. Additionally, or alternatively, the central wireless device may perform aspects of the described functions using special-purpose hardware.

At 905, the method may include monitoring, in a first subevent of a set of multiple isochronous subevents of an isochronous interval, for a first data packet from a first peripheral wireless device of a set of multiple peripheral wireless devices in a CIG, the first data packet associated with a first SN. The operations of 905 may be performed in accordance with examples as disclosed herein. In some examples, aspects of the operations of 905 may be performed by a data packet manager 725 as described with reference to FIG. 7.

At 910, the method may include monitoring, in a second subevent of the set of multiple isochronous subevents of the isochronous interval, for a second data packet from a second peripheral wireless device of the set of multiple peripheral wireless devices in the CIG, the second data packet associated with a second SN. The operations of 910 may be performed in accordance with examples as disclosed herein. In some examples, aspects of the operations of 910 may be performed by a data packet manager 725 as described with reference to FIG. 7.

At 915, the method may include transmitting, in a third subevent of the set of multiple isochronous subevents of the isochronous interval and to the set of multiple peripheral wireless devices in the CIG, a group feedback message based on the monitoring, where the group feedback message includes acknowledgment information corresponding to the first data packet and the second data packet. The operations of 915 may be performed in accordance with examples as disclosed herein. In some examples, aspects of the operations of 915 may be performed by a feedback manager 730 as described with reference to FIG. 7.

Figure 10:
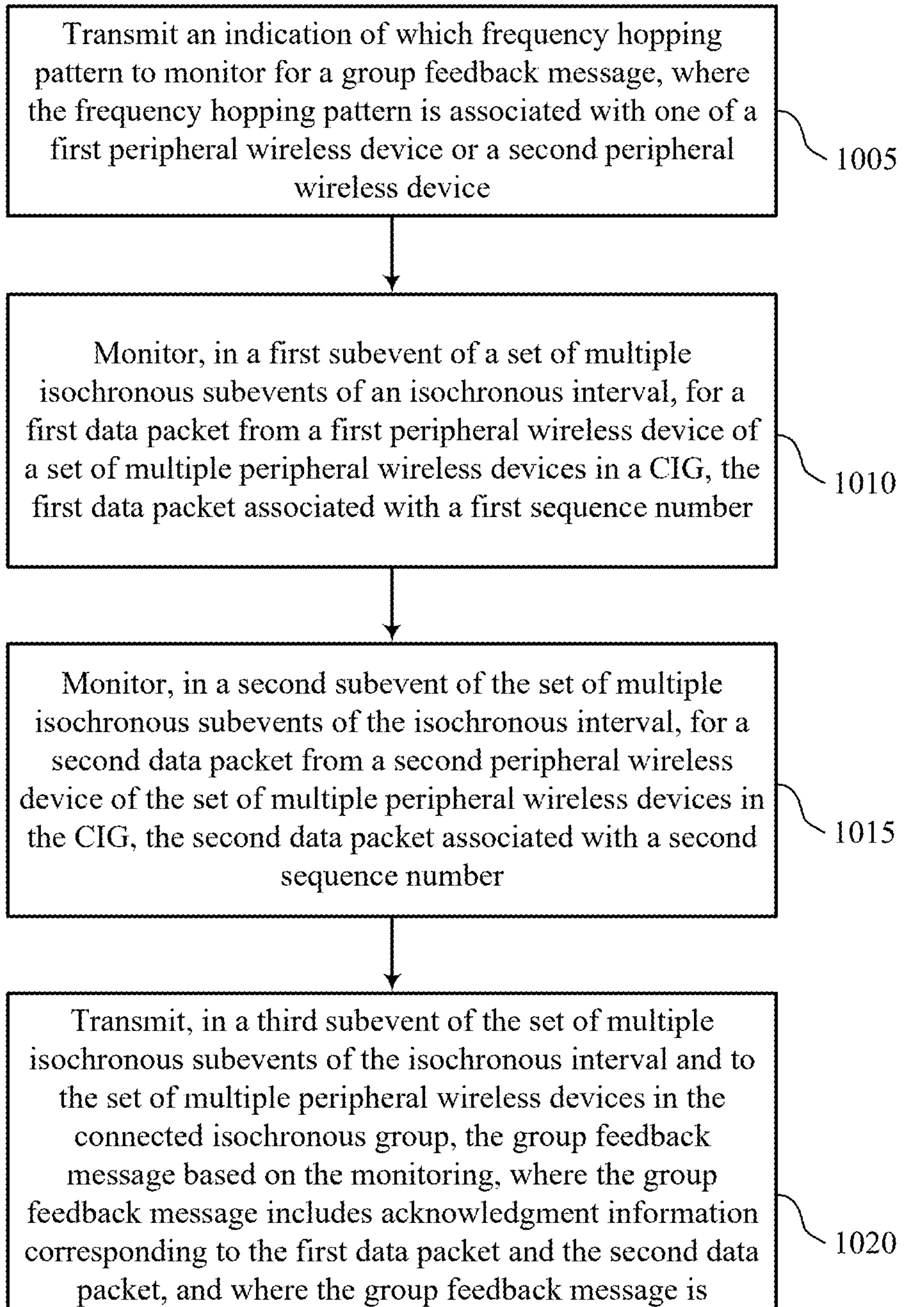

FIG. 10 shows a flowchart illustrating a method 1000 that supports reduction of ISO bandwidth on a central wireless device. The operations of the method 1000 may be implemented by a central wireless device or its components as described herein. For example, the operations of the method 1000 may be performed by a central wireless device as described with reference to FIGS. 1 through 7. In some examples, a central wireless device may execute a set of instructions to control the functional elements of the central wireless device to perform the described functions. Additionally, or alternatively, the central wireless device may perform aspects of the described functions using special-purpose hardware.

At 1005, the method may include transmitting an indication of which frequency hopping pattern to monitor for the group feedback message. The operations of 1005 may be performed in accordance with examples as disclosed herein. In some examples, aspects of the operations of 1005 may be performed by a feedback manager 730 as described with reference to FIG. 7.

At 1010, the method may include monitoring, in a first subevent of a set of multiple isochronous subevents of an isochronous interval, for a first data packet from a first peripheral wireless device of a set of multiple peripheral wireless devices in a CIG, the first data packet associated with a first SN. The operations of 1010 may be performed in accordance with examples as disclosed herein. In some examples, aspects of the operations of 1010 may be performed by a data packet manager 725 as described with reference to FIG. 7.

At 1015, the method may include monitoring, in a second subevent of the set of multiple isochronous subevents of the isochronous interval, for a second data packet from a second peripheral wireless device of the set of multiple peripheral wireless devices in the CIG, the second data packet associated with a second SN. The operations of 1015 may be performed in accordance with examples as disclosed herein. In some examples, aspects of the operations of 1015 may be performed by a data packet manager 725 as described with reference to FIG. 7.

At 1020, the method may include transmitting, in a third subevent of the set of multiple isochronous subevents of the isochronous interval and to the set of multiple peripheral wireless devices in the CIG, a group feedback message based on the monitoring, where the group feedback message includes acknowledgment information corresponding to the first data packet and the second data packet. The operations of 1020 may be performed in accordance with examples as disclosed herein. In some examples, aspects of the operations of 1020 may be performed by a feedback manager 730 as described with reference to FIG. 7.

FIG. 11 shows a flowchart illustrating a method 1100 that supports reduction of ISO bandwidth on a central wireless device. The operations of the method 1100 may be implemented by a peripheral wireless device or its components as described herein. For example, the operations of the method 1100 may be performed by a peripheral wireless device as described with reference to FIGS. 1 through 6 and 8. In some examples, a peripheral wireless device may execute a set of instructions to control the functional elements of the peripheral wireless device to perform the described functions. Additionally, or alternatively, the peripheral wireless device may perform aspects of the described functions using special-purpose hardware.

At 1105, the method may include transmitting, in a first subevent of a set of multiple isochronous subevents of an isochronous interval, a first data packet associated with a first SN. The operations of 1105 may be performed in accordance with examples as disclosed herein. In some examples, aspects of the operations of 1105 may be performed by a data packet component 825 as described with reference to FIG. 8.

At 1110, the method may include receiving, in a second subevent of the set of multiple isochronous subevents of the isochronous interval, a group feedback message based on transmitting the first data packet, where the group feedback message includes acknowledgment information corresponding to the first data packet and a second data packet from a second peripheral wireless device of the set of multiple peripheral wireless devices in the CIG. The operations of 1110 may be performed in accordance with examples as disclosed herein. In some examples, aspects of the operations of 1110 may be performed by a feedback component 830 as described with reference to FIG. 8.

Implementation examples are described in the following numbered clauses:

The following provides an overview of aspects of the present disclosure:

Aspect 1: A method for wireless communications at a central wireless device, comprising: monitoring, in a first subevent of a plurality of isochronous subevents of an isochronous interval, for a first data packet from a first peripheral wireless device of a plurality of peripheral wireless devices in a connected isochronous group, the first data packet associated with a first sequence number; monitoring, in a second subevent of the plurality of isochronous subevents of the isochronous interval, for a second data packet from a second peripheral wireless device of the plurality of peripheral wireless devices in the connected isochronous group, the second data packet associated with a second sequence number; and transmitting, in a third subevent of the plurality of isochronous subevents of the isochronous interval and to the plurality of peripheral wireless devices in the connected isochronous group, a group feedback message based at least in part on the monitoring, wherein the group feedback message includes acknowledgment information corresponding to the first data packet and the second data packet.

Aspect 2: The method of aspect 1, wherein transmitting the group feedback message further comprises: transmitting a single bit that indicates acknowledgment information for both the first peripheral wireless device and the second peripheral wireless device.

Aspect 3: The method of aspect 1, wherein transmitting the group feedback message further comprises: transmitting a bitmap that includes acknowledgment information for the first peripheral wireless device and acknowledgment information for the second peripheral wireless device, the bitmap indicating whether the central wireless device successfully received the first data packet, the second data packet, or both.

Aspect 4: The method of any of aspects 1 through 3, wherein each of the first peripheral wireless device and the second peripheral wireless device is associated with a respective frequency hopping pattern, and the group feedback message is transmitted in accordance with the frequency hopping pattern of one or both of the first peripheral wireless device or the second peripheral wireless device.

Aspect 5: The method of aspect 4, further comprising: transmitting an indication of which frequency hopping pattern to monitor for the group feedback message.

Aspect 6: The method of any of aspects 1 through 5, wherein the first peripheral wireless device is associated with a first set of one or more subevents of the isochronous interval and the second peripheral wireless device is associated with a second set of one or more subevents of the isochronous interval, and the third subevent is associated with one of the first set of one or more subevents or the second set of one or more subevents.

Aspect 7: The method of aspect 6, further comprising: transmitting an indication of which of the first set of one or more subevents or the second set of one or more subevents to monitor for the group feedback message.

Aspect 8: The method of any of aspects 1 through 7, wherein the acknowledgment information includes a first next expected sequence number for the first peripheral wireless device and a second expected sequence number for the second peripheral wireless device.

Aspect 9: The method of any of aspects 1 through 8, further comprising: monitoring, in a fourth subevent of the plurality of isochronous subevents of the isochronous interval, for a retransmission of the first data packet from the first peripheral wireless device of the plurality of peripheral wireless devices in the connected isochronous group based at least in part on the acknowledgment information including a negative acknowledgment for the first data packet; and transmitting, in a fourth subevent of the plurality of isochronous subevents of the isochronous interval, a feedback message based at least in part on the monitoring.

Aspect 10: A method for wireless communications at a first peripheral wireless device of a plurality of peripheral wireless devices in a connected isochronous group, comprising: transmitting, in a first subevent of a plurality of isochronous subevents of an isochronous interval, a first data packet associated with a first sequence number; and receiving, in a second subevent of the plurality of isochronous subevents of the isochronous interval, a group feedback message based at least in part on transmitting the first data packet, wherein the group feedback message includes acknowledgment information corresponding to the first data packet and a second data packet from a second peripheral wireless device of the plurality of peripheral wireless devices in the connected isochronous group.

Aspect 11: The method of aspect 10, wherein receiving the group feedback message further comprises: receiving a single bit that indicates acknowledgment information for both the first peripheral wireless device and the second peripheral wireless device.

Aspect 12: The method of aspect 10, wherein receiving the group feedback message further comprises: receiving a bitmap that includes acknowledgment information for the first peripheral wireless device and acknowledgment information for the second peripheral wireless device, the bitmap indicating whether the first data packet, the second data packet, or both was successfully received.

Aspect 13: The method of any of aspects 10 through 12, wherein each of the first peripheral wireless device and the second peripheral wireless device is associated with a respective frequency hopping pattern, and the group feedback message is received in accordance with the frequency hopping pattern of one or both of the first peripheral wireless device or the second peripheral wireless device.

Aspect 14: The method of aspect 13, further comprising: receiving an indication of which frequency hopping pattern to monitor for the group feedback message.

Aspect 15: The method of any of aspects 10 through 14, wherein the first peripheral wireless device is associated with a first set of one or more subevents of the isochronous interval and the second peripheral wireless device is associated with a second set of one or more subevents of the isochronous interval, and the second subevent is associated with one of the first set of one or more subevents or the second set of one or more subevents.

Aspect 16: The method of aspect 15, further comprising: receiving an indication of which of the first set of one or more subevents or the second set of one or more subevents to monitor for the group feedback message.

Aspect 17: The method of any of aspects 10 through 16, wherein the acknowledgment information includes a first next expected sequence number for the first peripheral wireless device and a second expected sequence number for the second peripheral wireless device.

Aspect 18: The method of any of aspects 10 through 17, further comprising: transmitting, in a fourth subevent of the plurality of isochronous subevents of the isochronous interval, a retransmission of the first data packet based at least in part on the acknowledgment information including a negative acknowledgment for the first data packet; and receiving, in a fourth subevent of the plurality of isochronous subevents of the isochronous interval, a feedback message based at least in part on the retransmission.

Aspect 19: A central wireless device for wireless communications, comprising one or more memories storing processor-executable code, and one or more processors coupled with the one or more memories and individually or collectively operable to execute the code to cause the central wireless device to perform a method of any of aspects 1 through 9.

Aspect 20: A central wireless device for wireless communications, comprising at least one means for performing a method of any of aspects 1 through 9.

Aspect 21: A non-transitory computer-readable medium storing code for wireless communications, the code comprising instructions executable by one or more processors to perform a method of any of aspects 1 through 9.

Aspect 22: A first peripheral wireless device of a plurality of peripheral wireless devices in a connected isochronous group for wireless communications, comprising one or more memories storing processor-executable code, and one or more processors coupled with the one or more memories and individually or collectively operable to execute the code to cause the first peripheral wireless device of a plurality of peripheral wireless devices in a connected isochronous group to perform a method of any of aspects 10 through 18.

Aspect 23: A first peripheral wireless device of a plurality of peripheral wireless devices in a connected isochronous group for wireless communications, comprising at least one means for performing a method of any of aspects 10 through 18.

Aspect 24: A non-transitory computer-readable medium storing code for wireless communications, the code comprising instructions executable by one or more processors to perform a method of any of aspects 10 through 18.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A central wireless device, comprising:

a processing system that includes processor circuitry and memory circuitry that stores code, the processing system configured to cause the central wireless device to:

monitor, in a first subevent of a plurality of isochronous subevents of an isochronous interval, for a first data packet from a first peripheral wireless device of a plurality of peripheral wireless devices in a connected isochronous group, the first data packet associated with a first sequence number;

monitor, in a second subevent of the plurality of isochronous subevents of the isochronous interval, for a second data packet from a second peripheral wireless device of the plurality of peripheral wireless devices in the connected isochronous group, the second data packet associated with a second sequence number;

transmit, in a third subevent of the plurality of isochronous subevents of the isochronous interval and to the plurality of peripheral wireless devices in the connected isochronous group, a group feedback message based at least in part on the monitoring, wherein the group feedback message includes acknowledgment information corresponding to the first data packet and the second data packet; and wherein the acknowledgment information includes a first next expected sequence number for the first peripheral wireless device and a second next expected sequence number for the second peripheral wireless device.

2. The central wireless device of claim 1, wherein, to transmit the group feedback message, the processing system is further configured to cause the central wireless device to:

transmit a single bit that indicates acknowledgment information for both the first peripheral wireless device and the second peripheral wireless device.

3. The central wireless device of claim 1, wherein, to transmit the group feedback message, the processing system is further configured to cause the central wireless device to:

transmit a bitmap that includes acknowledgment information for the first peripheral wireless device and acknowledgment information for the second peripheral wireless device, the bitmap indicating whether the central wireless device successfully received the first data packet, the second data packet, or both.

4. The central wireless device of claim 1, wherein each of the first peripheral wireless device and the second peripheral wireless device is associated with a respective frequency hopping pattern, and the group feedback message is transmitted in accordance with the frequency hopping pattern of one or both of the first peripheral wireless device or the second peripheral wireless device.

5. The central wireless device of claim 4, wherein the processing system is further configured to cause the central wireless device to:

transmit an indication of which frequency hopping pattern to monitor for the group feedback message.

6. The central wireless device of claim 1, wherein the first peripheral wireless device is associated with a first set of one or more subevents of the isochronous interval and the second peripheral wireless device is associated with a second set of one or more subevents of the isochronous interval, and the third subevent is associated with one of the first set of one or more subevents or the second set of one or more subevents.

7. The central wireless device of claim 6, wherein the processing system is further configured to cause the central wireless device to:

transmit an indication of which of the first set of one or more subevents or the second set of one or more subevents to monitor for the group feedback message.

8. The central wireless device of claim 1, wherein the processing system is further configured to cause the central wireless device to:

monitor, in a fourth subevent of the plurality of isochronous subevents of the isochronous interval, for a retransmission of the first data packet from the first peripheral wireless device of the plurality of peripheral wireless devices in the connected isochronous group based at least in part on the acknowledgment information including a negative acknowledgment for the first data packet; and transmit, in the fourth subevent of the plurality of isochronous subevents of the isochronous interval, a feedback message based at least in part on the monitoring.

9. A method for wireless communications at a central wireless device, comprising:

monitoring, in a first subevent of a plurality of isochronous subevents of an isochronous interval, for a first data packet from a first peripheral wireless device of a plurality of peripheral wireless devices in a connected isochronous group, the first data packet associated with a first sequence number;

monitoring, in a second subevent of the plurality of isochronous subevents of the isochronous interval, for a second data packet from a second peripheral wireless device of the plurality of peripheral wireless devices in the connected isochronous group, the second data packet associated with a second sequence number;

transmitting, in a third subevent of the plurality of isochronous subevents of the isochronous interval and to the plurality of peripheral wireless devices in the connected isochronous group, a group feedback message based at least in part on the monitoring, wherein the group feedback message includes acknowledgment information corresponding to the first data packet and the second data packet; and wherein the first peripheral wireless device is associated with a first set of one or more subevents of the isochronous interval and the second peripheral wireless device is associated with a second set of one or more subevents of the isochronous interval, the third subevent is associated with one of the first set of one or more subevents or the second set of one or more subevents and transmitting an indication of which of the first set of one or more subevents or the second set of one or more subevents to monitor for the group feedback message.

10. The method of claim 9, wherein transmitting the group feedback message further comprises:

transmitting a single bit that indicates acknowledgment information for both the first peripheral wireless device and the second peripheral wireless device.

11. The method of claim 9, wherein transmitting the group feedback message further comprises:

transmitting a bitmap that includes acknowledgment information for the first peripheral wireless device and acknowledgment information for the second peripheral wireless device, the bitmap indicating whether the central wireless device successfully received the first data packet, the second data packet, or both.

12. The method of claim 9, wherein each of the first peripheral wireless device and the second peripheral wireless device is associated with a respective frequency hopping pattern, and the group feedback message is transmitted in accordance with the frequency hopping pattern of one or both of the first peripheral wireless device or the second peripheral wireless device.

13. The method of claim 12, further comprising:

transmitting an indication of which frequency hopping pattern to monitor for the group feedback message.

14. The method of claim 9, wherein the acknowledgment information includes a first next expected sequence number for the first peripheral wireless device and a second next expected sequence number for the second peripheral wireless device.

15. The method of claim 9, further comprising:

monitoring, in a fourth subevent of the plurality of isochronous subevents of the isochronous interval, for a retransmission of the first data packet from the first peripheral wireless device of the plurality of peripheral wireless devices in the connected isochronous group based at least in part on the acknowledgment information including a negative acknowledgment for the first data packet; and transmitting, in the fourth subevent of the plurality of isochronous subevents of the isochronous interval, a feedback message based at least in part on the monitoring.

16. A first peripheral wireless device of a plurality of peripheral wireless devices in a connected isochronous group, comprising:

a processing system that includes processor circuitry and memory circuitry that stores code, the processing system configured to cause the first peripheral wireless device of a plurality of peripheral wireless devices in a connected isochronous group to:

transmit, in a first subevent of a plurality of isochronous subevents of an isochronous interval, a first data packet associated with a first sequence number;

receive, in a second subevent of the plurality of isochronous subevents of the isochronous interval, a group feedback message based at least in part on transmitting the first data packet, wherein the group feedback message includes acknowledgment information corresponding to the first data packet and a second data packet from a second peripheral wireless device of the plurality of peripheral wireless devices in the connected isochronous group; and wherein the acknowledgment information includes a first next expected sequence number for the first peripheral wireless device and a second next expected sequence number for the second peripheral wireless device.

* * * * *